(12) United States Patent
Morkel et al.

(10) Patent No.: US 10,802,931 B1
(45) Date of Patent: Oct. 13, 2020

(54) MANAGEMENT OF SHADOWING FOR DEVICES

(71) Applicant: Amazon Technologies, Inc., Seattle, WA (US)

(72) Inventors: John Morkel, Seattle, WA (US); Sergejus Barinovas, Mercer Island, WA (US); Manish Geverchand Jain, Seattle, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/198,497

(22) Filed: Nov. 21, 2018

(51) Int. Cl.
*G06F 11/20* (2006.01)
*G06F 3/06* (2006.01)

(52) U.S. Cl.
CPC .......... *G06F 11/2025* (2013.01); *G06F 3/065* (2013.01); *G06F 3/067* (2013.01); *G06F 3/0619* (2013.01); *G06F 2201/805* (2013.01)

(58) Field of Classification Search
CPC .... G06F 11/2025; G06F 3/0619; G06F 3/065; G06F 3/067; G06F 2201/805; G06F 11/0703; G06F 11/0709; G06F 11/0727; G16Y 30/00; G16Y 40/20; G16Y 40/35
See application file for complete search history.

(56) References Cited

U.S. PATENT DOCUMENTS

| | | | |
|---|---|---|---|
| 2007/0027939 A1* | 2/2007 | Yamagami | G06F 11/2074 |
| 2011/0219189 A1* | 9/2011 | Arakawa | G06F 11/2064 |
| | | | 711/119 |
| 2019/0227880 A1* | 7/2019 | Tkaczyk-Walczak | |
| | | | G06F 16/1748 |

* cited by examiner

*Primary Examiner* — Matthew M Kim
*Assistant Examiner* — Kurosu Risa Altaf
(74) *Attorney, Agent, or Firm* — Thorpe North & Western, LLP.

(57) ABSTRACT

Technology is described for management of shadowing for devices. A computing hub may store device data from a device in a buffer associated with a local device shadow of the device. The computing hub may determine a write status of the device data using a last write marker representing a last data entry written to the buffer. The computing hub may also determine a shadowing upload status of the device data using a last sent shadow marker representing a last data entry of the buffer sent to a device shadowing service in a service provider environment. The computing hub may send computing hub information that includes the last write marker and the last sent shadow marker to the device shadowing service in the service provider environment.

20 Claims, 13 Drawing Sheets

MANAGEMENT OF SHADOWING FOR DEVICES

BACKGROUND

Electronic devices and computing systems have become ever-present in many aspects of society. Devices may be found in the workplace, at home or at school. Computing systems may include computing and data storage systems to process and store data. Some computing systems offer centralized, virtual computing options known as service provider environments that may reduce overall costs, improve availability, improve scalability, and reduce time to deploy new applications.

Electronic devices may also be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. The Internet of Things (IoT) is the interconnection of electronic devices, some of which may be scattered across the globe, using the existing Internet infrastructure. Electronic devices (e.g., IoT devices, etc.) may be useful for a number of applications, such as environmental monitoring, farming, infrastructure management, industrial applications, building and home automation, energy management, medical and healthcare systems, transport systems, etc.

Advancements in communication technologies (e.g., IoT and similar technologies) have allowed even relatively inexpensive electronic devices to communicate with other devices and computing systems over a computer network (e.g., using MQTT or other lightweight communication protocols). Such devices may be able to capture data, and then the devices may securely communicate the data over a network to a centralized computing service in a service provider environment. In one example, the devices may send the data to a computing hub or computing node in a local wireless network, and the computing hub may forward the data received from the devices to a centralized service in the service provider environment.

DETAILED DESCRIPTION

Figure 1:
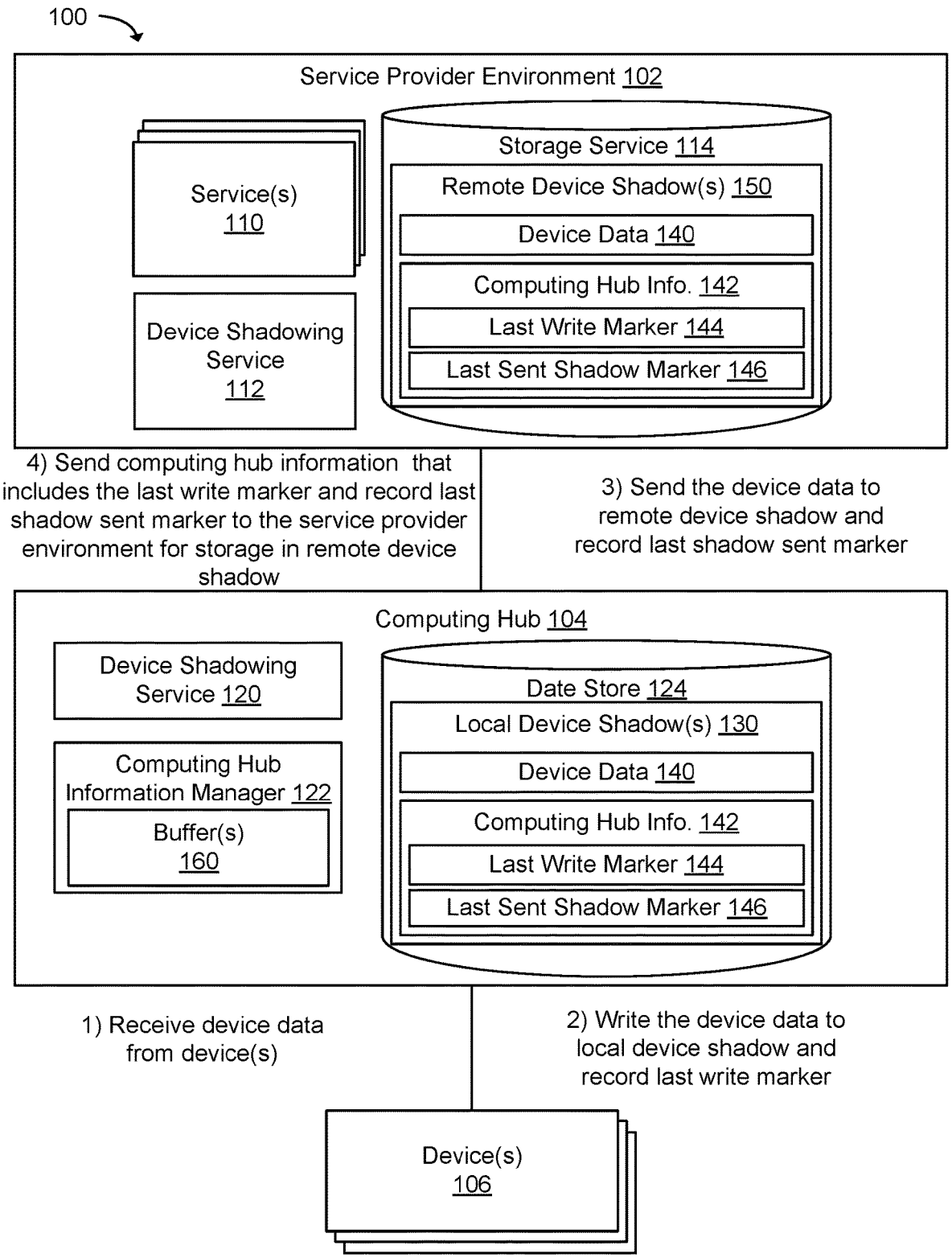
FIG. 1 illustrates a system and related operations that may implement management of device shadows according to an example of the present technology.

A technology is described for management of data shadowing for devices and/or computing hubs. For example, a computing hub may be a device that receives data (e.g. sensor telemetry data) from a device in a local network. The device may be one of many devices that creates a network of addressable and/or eventually addressable (e.g., capable of receiving relayed messages) devices. This entire "network" of devices may commonly be referred to as the Internet of Things (IoT). The computing hub may be configured to receive the device states and device data from the device and manage storage of the states and data in a device shadow used to represent device data and states of the device. The computing hub may be configured to read or modify the device data and the device states represented in the device shadow in response to an event or a request. In addition, the computing hub may synchronize the device data and the device states represented in a local device shadow to a device shadow service in a service provider environment. The device shadow service may be configured to manage a remote device shadow of the device that includes the device data and the device states synchronized from the local device shadow.

A device shadow of a device, whether referenced as local or remote, may represent one or more states of the device and include a shadow copy of the device data. As an example, the device shadow may represent fixed attributes or states (e.g., "includes lightbulb socket") and dynamic states (e.g., "lightbulb on" or "lightbulb off") of the device. Instead of querying a device directly to obtain the current states of the device, which may only be intermittently reachable for various reasons, the device shadow of the corresponding device may be queried to obtain the last known states of the device. Querying the device shadow of the device for the device data or last known states of the device may result in generating state for the device in a shorter amount of time as compared to querying the device directly due to the possibility that the device is not reachable at the time that the device is queried or the device is slow in responding to the query. Querying the device shadow of the device may involve requests to local environments near to the computing hub (e.g., using the local device shadow of the device) or requests to a service provider environment (e.g., using the remote device shadow of the device).

According to the present technology, a computing hub may manage the local device shadow of the device. For example, the computing hub may receive device data from the device. The computing hub may then store the device data represented as data entries in a buffer associated with the local device shadow of the device. The computing hub may also determine a write status of the device data in the buffer, and the computing hub may track a last write marker representing a last data entry written to the buffer from the device data received from the device. The computing hub may store the write status of the device data, including the last write marker for the last written data entry, in the local device shadow of the device. The computing hub may further send the write status of the device data, including the last write marker for the last written data entry, to the device shadow service in the service provider environment for storage in the remote device shadow of the device.

In another example, the computing hub may send the device data represented as data entries in the buffer to the device shadow service in the service provider environment for storage in the remote device shadow of the device. The computing hub may also determine a shadowing upload status of the device data in the buffer. The computing hub may track a last sent shadow marker representing a last data entry in the buffer sent to the device shadowing service. The computing hub may store the shadowing upload status of the device data, including the last sent shadow marker for the last sent data entry, in the local device shadow of the device. The computing hub may further send the shadowing upload status of the device data, including the last sent shadow marker for the last sent data entry, to the device shadow service in the service provider environment for storage in the remote device shadow of the device.

In one example of the present technology, operation and/or performance of the computing hub may be improved using computing hub information stored in the device shadows. The computing hub information stored in a device shadow may include a last write marker for the last data entry written to a buffer associated with the device shadow and a last sent shadow maker for the last data entry sent from the buffer to the device shadowing service in the service provider environment. For example, the computing hub may resume management of the local device shadow of the device using the last write marker and the last sent shadow marker in the case of a computing interruption event (e.g., restart, reboot, etc.). In response to a restart or reboot, the computing hub may determine whether device data received from a device has been written to the buffer associated with a local device shadow of the device using the last write marker obtained from the local device shadow of the device.

Then, the computing hub may further resume sending device data to the device shadow service in the service provider environment as defined by the last sent shadow marker obtained from the local device shadow of the device. Accordingly, the computing hub information stored in the local device shadow decreases the startup time of the computing hub to resume processing of the device data received from the device in the event of a computing interruption event.

In another example, one computing hub may take over management of a local device shadow of a device from another computing hub using the computing hub information stored in the device shadows. For example, the computing hub may take over the management of the local device shadow of the device using the last write marker and the last sent shadow marker in the case of a computing failure event (e.g., hardware failure, unrecoverable software crash) or maintenance event. In the event of a failure in another computing hub, the local device shadow of the device may be inaccessible or corrupt. Accordingly, the computing hub may retrieve the computing hub information from the remote device shadow of the device from the device shadowing service in the service provider environment. The computing hub may determine what device data received from the device has been written to the buffer associated with the local device shadow using the last write marker obtained from the remote device shadow of the device. The computing hub may further resume sending the device data to the device shadow service in the service provider environment using the last sent shadow marker obtained from the remote device shadow of the device. Therefore, the computing hub may verify and then resume storage and shadow upload processing of the device data in the buffer associated with the local device shadow of the device using the last write marker and the last sent shadow marker. Accordingly, the computing hub information stored in the remote device shadow decreases the startup time of the computing hub to take over processing of the device data received from the device in the event of a computing failure event in another computing hub (e.g., a computing hub fail-over).

In another example of the present technology, a device shadow may be analyzed to determine performance data with respect to the computing hub managing the device shadow (e.g., writing and uploading shadow data) using the computing hub information stored in the device shadow. For example, a monitoring service may generate performance data for the computing hub with respect to the device using the computing hub information in a local or remote device shadow of the device that includes the last write marker and the last sent shadow marker. The monitoring service may be hosted by the computing hub or in the service provider environment. The monitoring service may receive a metric to measure a performance characteristic of the computing hub using the computing hub information. The monitoring service may monitor a device shadow of the device according to the metric.

For example, the monitoring service may retrieve the computing hub information from the device shadow to determine a difference between the last write marker and the last sent shadow marker to determine an amount of time lag between storing the device data in the device shadow and sending the device data to the device shadow service in the service provider environment. The computing hub information may contain the device shadows and markers for multiple devices. In another example, the monitoring service may retrieve the computing hub information from the device shadow to determine a difference between the last write marker and the last sent shadow marker to determine an amount of data in the device shadow waiting to be sent to the device shadow service in the service provider environment. In another example, the monitoring service may generate notifications with respect to the performance data generated from monitoring the device shadow. A notification may be generated when a difference between the last write marker and the last sent shadow marker satisfies a notification rule.

Additionally, the monitoring service may manage computing events using the performance data generated with respect to the computing hub managing the device shadow. The monitoring service may manage computing events related to data processing operations, such as filtering, aggregation, transformation, detecting relationships, pattern recognition, and the like, with the device data of the device shadow. In another example, the monitoring service may manage events related to the operation of the computing hub, such as detecting when utilization of a resource exceeds a threshold, managing processor and memory allocations, detecting network connectivity or bandwidth, and the like. The monitoring service may directly trigger a computing event when a predetermined condition is satisfied using the computing hub information retrieved from the device shadow.

The monitoring service may also use the computing hub information retrieved from the device shadow to determine whether to allow a previously triggered computing event to proceed to completion. For example, the monitoring service may use the last write marker to verify that a predetermined amount of device data requested by the computing event has been written to the device shadow. In another example, the monitoring service may use the last sent shadow marker to verify that a predetermined amount of device data requested by the event has sent to the device shadowing service in the service provider environment.

FIG. 1—Management of Device Shadows Using Computing Hub Information

FIG. 1 illustrates a system 100 and related operations that may implement management of device shadows according to an example of the present technology. FIG. 1 illustrates example components of the present technology in communication with a service provider environment 102. The service provider environment 102 may be capable of delivery of computing, storage, and networking capacity as a software service to a community of end recipients. In one example, the service provider environment 102 may be established for an organization by or on behalf of the organization. That is, the service provider environment 102 may offer a "private cloud environment." In another example, the service provider environment 102 may support a multi-tenant environment, wherein a plurality of customers may operate independently (i.e., a public cloud environment). Generally speaking, the service provider environment 102 may provide the following models: Infrastructure as a Service ("IaaS") and/or Software as a Service ("SaaS"). Other models may be provided. For the IaaS model, the service provider environment 102 may offer computers as physical or virtual machines and other resources Application developers may develop and run their software solutions on the service provider environment 102 without incurring the cost of buying and managing the underlying hardware and software. The SaaS model allows installation and operation of application software in the service provider environment 102. End customers may access the service provider environment 102 using networked client devices, such as desktop computers, laptops, tablets, smartphones, etc., running web browsers or other lightweight client applications, for example.

The service provider environment 102 may include a number of computing devices that are arranged, for example, in one or more server banks or computer banks or other arrangements. The computing devices may support a computing environment using hypervisors, virtual machine managers (VMMs), and other virtualization software.

The computing devices may provide one or more service(s) 110, such as a device shadowing service 112, and a storage service 114. The service(s) 110 may be considered on-demand computing that are hosted in a server, virtualized service environment, grid or cluster computing system. Some examples of the service(s) 110 that may be provided by the service provider environment 102 may include compute services, data store services, networking services, web services, streaming services, network accessible services, software as a service, storage as a service, on-demand applications, services for the execution of code functions, and services associated with rules system computational models.

As illustrated, the service provider environment 102 may be in communication with a computing hub 104 (e.g., using a network). For example, the service provider environment 102 and the computing hub 104 may be connected by the Internet or a wide area network (WAN). The computing hub 104 may be in communication with one or more device(s) 106. For example, the computing hub 104 and the device(s) 106 may be connected by a local area network (LAN).

The computing hub 104 may include, for example, processor-based systems. The computing hub 104 may include one or more hardware and/or software elements for providing one or more services for the device(s) 106. For example, the computing hub 104 may provide communication services between the device(s) 106 and the service provider environment 102. The computing hub 104 may forward data generated by the device(s) 106 to the service(s) 110 for collection, aggregation, formatting, processing, storage, and the like. In another example, the computing hub 104 may provide local data processing services for the data (e.g., telemetry data) generated by the device(s) 106.

The device(s) 106 may be, for example, processor-based systems or embedded systems. The device(s) 106 may include, but are not limited to, a desktop computer, laptop or notebook computer, tablet computer, handheld computer, workstation, network computer, or other devices with like capability. In another example, the device(s) 106 may include IoT devices. As non-limiting examples, the device(s) 106 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over a network with the computing hub 104. Commercial devices may also be included in the definition of the device(s) 106, including: commercial printing presses, commercial freezers, commercial kilns, commercial mixers, or other commercial equipment. The device(s) 106 may be other types of embedded devices that provide electronic controls for a machine or system.

As illustrated in FIG. 1, the computing hub 104 may include a device shadowing service 120, a computing hub information manager 122, and a data store 124. The device shadowing service 120 may include hardware and/or software elements for processing and storage of device data received by the computing hub 104 from the device(s) 106. The device shadowing service 120 may be configured to manage one or more local device shadow(s) 130 stored in the data store 124 that represent the data, states, and other information for the device(s) 106 using device data 140. The device shadowing service 120 may also handle storage of and access to the device data 140 received from the device(s) 106 and stored in the local device shadow(s) 130. The device shadowing service 120 may further synchronize the local device shadow(s) 130 in the data store 124 to the device shadowing service 112 in the service provider environment 102 for storage as one or more remote device shadow(s) 150 using the storage service 114.

The device(s) 106 may report device data, state changes, and other information to the device shadowing service 120, and the reported information may be stored as the device data 140 within the local device shadow(s) 130 and synchronized with the remote device shadow(s) 150. The device shadow(s) 130 and 150 may include, in the device data 140, data that represents data emitted by one of the device(s) 106, which may be any data detected by the device via a sensor (e.g., location, temperature, or chemical composition). The device shadow(s) 130 and 150 may include, in the device data 140, data that represents multiple data points from the device(s) 106. As a specific example, one of the local device shadow(s) 130 may include device data 140 from device(s) 106 that reports location, temperature, and humidity data may represent, in the device data 140, each data point, (location, temperature, and humidity) reported by the device.

At times, the corresponding device(s) 106 may be unreachable. For example, to conserve power, some battery-powered devices and other similar device(s) 106 may disable wireless radios when not actively transmitting data to the computing hub 104 or may only enable their wireless radios when polling the computing hub 104 for updates. For these and other reasons, some of the device(s) 106 may connect to a network only intermittently, while the computing hub 104 may attempt to interact with the device(s) 106 at times that the device(s) 106 may not be connected to the network or may not otherwise be available.

In order to overcome limitations associated with intermittent connectivity, network bandwidth, and/or computing capacity, the computing hub 104 may locally use the device shadowing service 120 to maintain shadowed device representations for the device(s) 106. This may allow an application and/or service to access information, such as state information, for the device(s) 106 at any time through the computing hub 104. Additionally, the computing hub 104 may locally use the device shadowing service 120 to synchronize device representations for the device(s) 106 to the service provider environment. This can allow applications and/or the service(s) 110 to access the device data 140, such as state information, for the device(s) 106 at any time through the device shadowing service 112.

Additionally, in order to overcome limitations associated with intermittent connectivity, network bandwidth, and/or computing capacity, according to the present technology, the computing hub information manager 122 may include hardware and/or software elements for caching processing state associated with the device data 140 received by the computing hub 104 from the device(s) 106 and for storing the device data 140 in the local device shadow(s) 130. The computing hub information manager 122 may be configured to determine a status of the device data 140 received from the device(s) 106 as the device data 140 is processed, stored, and uploaded, and the status may be included in computing hub information 142 in the local device shadow(s) 130.

In one example, the computing hub information manager 122 may track storage of the device data 140 as data entries are written to one or more buffer(s) 160 associated with the local device shadow(s) 130. A data entry in the buffer(s) 160 may include all or a portion of the data associated with a sensor reading, such as one or more bytes, blocks, segments, packets, etc. The computing hub information manager 122 may maintain one of the buffer(s) 160 and one of the local device shadow(s) 130 for each of the device(s) 106. The computing hub information manager 122 may utilize a last write marker 144 to represent a last data entry written to the buffer(s) 160. For example, the last write marker 144 may include a pointer to a last data entry or to a last location at which data was written to the buffer. The last write marker 144 may include additional information, such as a timestamp, process identifier, environment variables, resources utilization statistics, and the like, at the time of tracking of the last data entry written to the buffer(s) 160. The computing hub information manager 122 may store the write status that includes the last write marker 144 in the computing hub information 142 in the local device shadow(s) 130. The computing hub information manager 122 may also send the write status that includes the last write marker 144 to the device shadowing service 112 in the service provider environment 102 for storage in the remote device shadow(s) 150. The last write marker 144 may be automatically synchronized between the local device shadow(s) 130 and the remote device shadow(s) 150, for example, when the device shadowing service 120 sends the device data 144 to the device shadowing service 112 in the service provider environment 102.

Additionally, the computing hub information manager 122 may be configured to determine a shadowing upload status of the device data 140 received from the device(s) 106. The computing hub information manager 122 may track shadowing of the device data 140 or data entries sent from the buffer(s) 160 associated with the local device shadow(s) 130 to the device shadowing service 112 in the service provider environment 102. The computing hub information manager 122 may utilize a last sent shadow marker 146 to represent a last data entry sent from the buffer to the device shadowing service 112 for storage in the remote device shadow(s) 150. For example, the last sent shadow marker 146 may include a pointer to a last data entry or to a last location (e.g., address, object, etc.) from which data was sent from the buffer to the device shadowing service 112 in the service provider environment 102. The last sent shadow marker 146 may include additional information, such as a timestamp, process identifier, environment variables, resources utilization statistics, and the like, for the last data entry sent to the device shadowing service 112 in the service provider environment 102. The computing hub information manager 122 may store the shadowing upload status that includes the last sent shadow marker in the computing hub information 142 in the local device shadow(s) 130. The computing hub information manager 122 may also send the shadowing upload status that includes the last sent shadow marker 146 to the device shadowing service 112 in the service provider environment 102 for storage in the remote device shadow(s) 150. The last sent shadow marker 146 may be automatically synchronized between the local device shadow(s) 130 and the remote device shadow(s) 150, for example, when the device shadowing service 120 sends the device data 140 to the device shadowing service 112 in the service provider environment 102.

Figure 2:
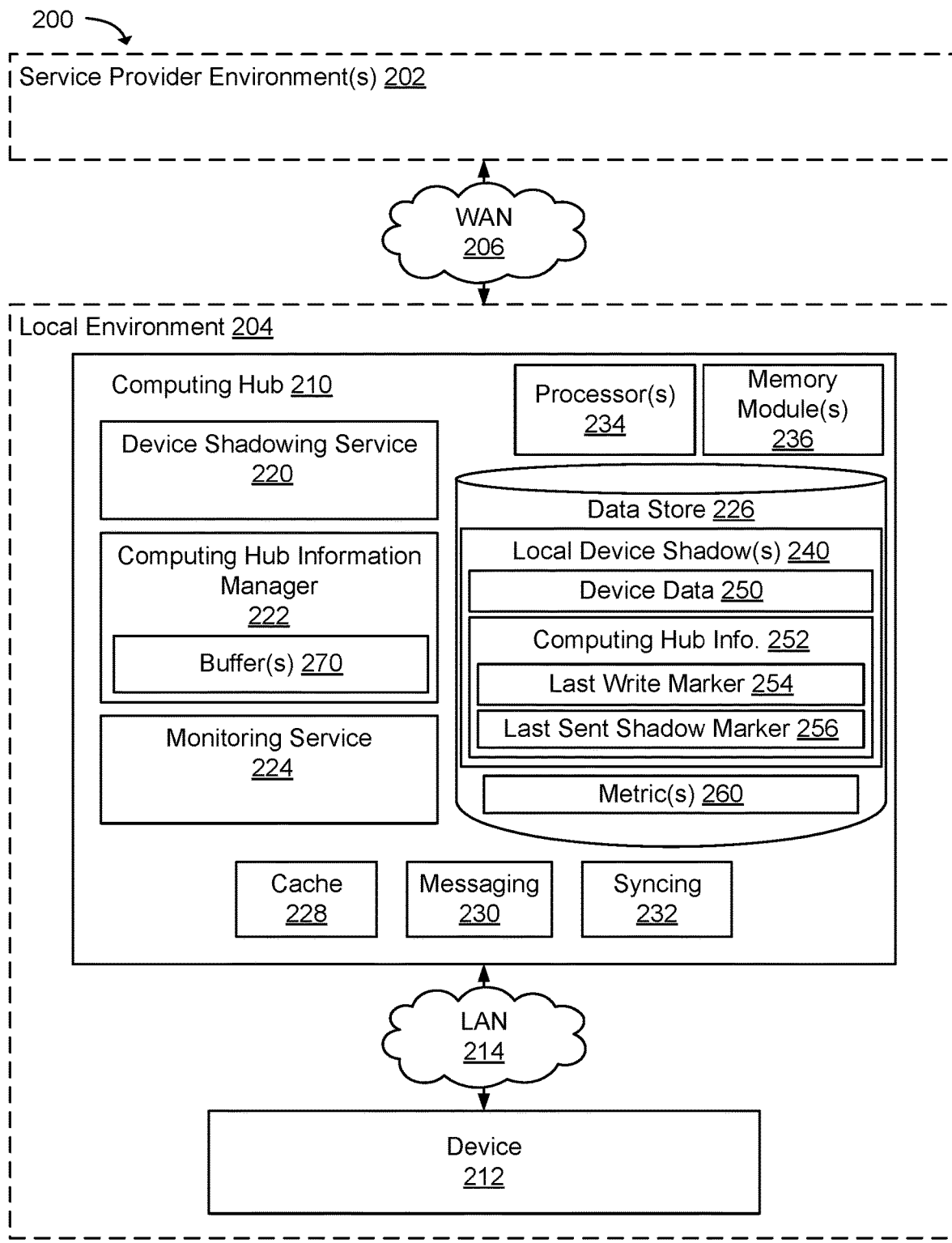
FIG. 2 is an illustration of a networked system providing management of local device shadow data according to an example of the present technology.

FIG. 2—Management of Device Shadows within Local Environments

FIG. 2 is an illustration of a networked system 200 providing management of local device shadow data according to an example of the present technology. As illustrated, the networked system 200 may include one or more service provider environment(s) 202, a local environment 204, and a wide area network (WAN) 206. The networked system 200 may utilize the WAN 206 to provide communication between the service provider environment(s) 202 and the local environment 204. The local environment 204 may include a computing hub 210, a device 212, and a local area network (LAN) 214. The local environment 204 may utilize the LAN 214 to provide communication between the computing hub 210 and the device 212.

The computing hub 210 may include a device shadowing service 220, a computing hub information manager 222, a monitoring service 224, a data store 226, a cache service 228, a messaging service 230, a synching service 232, one or more processor(s) 234, and one or more memory module(s) 236. The device shadowing service 220 may include hardware and/or software elements for processing and storage of device data 250 received by the computing hub 210 from the device 212. The device shadowing service 220 may be configured to manage one or more local device shadow(s) 240 stored in the data store 226 that represent the states of the device 212 and the device data 250. The device shadowing service 220 may include hardware and/or software elements for handling storage of, access to, and shadowing of the device data 250 received from the device 212 and stored in the local device shadow(s) 240.

In one example, the local device shadow(s) 240 may include a device state as a recorded state and a desired state in the device data 250. The recorded state may be the last known state of the device 212 represented by the local device shadow(s) 240, and the desired state may be a state to which the device 212 may be instructed to assume. For example, the computing hub 210 may request that the device 212 assume a desired state. In response, the device shadowing service 220 may be configured to update the desired state of the local device shadow(s) 240 for the device 212 to the desired state. The device 212 may then be instructed to assume the desired state. Thereafter, an indication that the device 212 assumed the desired state may be received and the recorded state of the local device shadow(s) 240 may be updated to the state assumed by the device 212.

The computing hub information manager 222 may include hardware and/or software elements for storing processing states associated with the device data 250 received by the computing hub 210 from the device 212 in computing hub information 252. The computing hub information manager 222 may be configured to determine a write status of the device data 250 received from the device 212. The computing hub information manager 222 may track data entries written to one or more buffer(s) 270 associated with the local device shadow(s) 240. The computing hub information manager 222 may utilize a last write marker 254 to represent a last data entry written to the buffer(s) 270. The computing hub information manager 222 may store the write status that includes the last write marker 254 in the computing hub information 252 in the local device shadow(s) 240.

Additionally, the computing hub information manager 222 may be configured to determine a shadowing upload status of the device data 250 received from the device 212. The computing hub information manager 122 may track data entries sent from the buffer(s) 270 associated with the local device shadow(s) 240 to be shadowed in the service provider environment(s) 202. The computing hub information manager 222 may utilize a last sent shadow marker 256 to represent a last data entry sent from the buffer(s) 270 to the service provider environment(s) 202. The computing hub information manager 222 may store the shadowing upload status that includes the last sent shadow marker 256 in the computing hub information 252 in the local device shadow(s) 240.

According to one example of the present technology, the computing hub 210 may utilize the computing hub information manager 222 to capture the computing hub information 252 for the processing and storage of the device data to reduce the time required to restart managing the local device shadows due to computing interruption or failure events. For example, the computing hub information manager 222 may capture the computing hub information 252 at the beginning, during, and at the end of a write process causing the device shadowing service 220 to write the device data 250 to the local device shadow(s) 240 and an upload process causing the device shadowing service 220 to shadow the device data 250 to the service provider environment(s) 202. The computing hub 210 may use the captured computing hub information 252 to recover from a restart, reboot, or failure in another computing hub. For example, the computing hub 210 may retrieve the last write marker 254 and the last sent shadow marker 256 from the local device shadow(s) 240 in the event of a reboot or a restart. The computing hub 210 may use the last write marker 254 and the last sent shadow marker 256 to resume processing, storage and shadowing of the device data 250 received from the device 212 for the local device shadow(s) 240. The computing hub 210 may, after the reboot or restart, utilize the last write marker 254 to determine whether the device data 250 has been written to the local device shadow(s) 240 and to determine what data to obtain from the device(s) 214. The computing hub 210 may, after the reboot or restart, utilize the last sent shadow marker 256 to determine whether the device data in the local device shadow(s) 240 has been sent to the service provider environment(s) 202.

The computing hub 210 may also perform analytics using the captured computing hub information 252 to determine performance of the computing hub 210 with respect to the device 212. For example, the computing hub 210 may use the captured computing hub information 252 to determine the rate at which the computing hub is storing the device data 250 in the local device shadow(s) 240. In another example, the computing hub 210 may use the captured device computing hub information 252 to determine a backlog between the rate at which the computing hub is storing the device data 250 in the local device shadow(s) 240 and the rate at which the computing hub is uploading the device data 250 to the service provider environment(s) 202.

Additionally, the computing hub 210 may use the captured device computing hub information 252 determine whether to allow a request for the device data 250 to access the device data 250 in the local device shadow(s) 240. The computing hub 210 may verify whether the captured device computing hub information 252 indicates the device data 250 is available for the request. The computing hub 210 may also trigger events using the captured computing hub information 252. For example, the computing hub 210 may use the captured device computing hub information 252 to determine whether to trigger an event to process the device data 250 in the local device shadow(s) 240 when the captured device computing hub information 252 indicates the device data 250 has been written to the buffer(s) 270 or uploaded to the service provider environment(s) 202.

The monitoring service 224 may include hardware and/or software elements for monitoring performance of the computing hub 210 with respect to the device 212 using the local device shadow(s) 240. For example, the monitoring service 224 may generate performance data according to one or more metric(s) 260 and the local device shadow(s) 240 stored in the data store 226. Some examples of the metric(s) 260 are CPU utilization, memory utilization, storage utilization, network transfer utilization, processing delays, processing backlogs, time metrics, data metrics, and the like. According to one example of the present technology, the monitoring service 224 may generate performance data for the computing hub 210 with respect to the device 212 using the computing hub information 252 captured by the computing hub information manager 222. The monitoring service 224 may monitor the local device shadow(s) 240 to determine a difference between the last write marker 254 and the last sent shadow marker 256. The difference between the last write marker 254 and the last sent shadow marker 256 may represent a difference in the rate at which the device shadowing service 220 processes the device data for storage in the local device shadow(s) 240 and the rate at which the device shadowing service 220 uploads the device data from the local device shadow(s) 240 to the service provider environment(s) 202. The difference between the last write marker 254 and the last sent shadow marker 256 may be represented, for example, using an amount of time lag or an amount of data lag.

According to another example of the present technology, the monitoring service 224 may use the computing hub information 252 captured by the computing hub information manager 222 to generate notifications about the processing by the computing hub 210 with respect to the device 212. The monitoring service 224 may determine whether a difference between the last write marker 254 and the last sent shadow marker 256 satisfies a notification rule. The notification rule may include a condition that when satisfied triggers a notification. The condition may include a comparison between the difference between the last write marker 254 and the last sent shadow marker 256 and a threshold. The notification may include a message, an alert, an alarm, and the like. Some examples of notification rules may include sending a message when the difference exceeds a predetermined amount of time, data, delay, etc. When the difference between the last write marker 254 and the last sent shadow marker 256 satisfies a notification rule, the monitoring service 224 may generate a notification indicating, for example, an amount of time lag or an amount of data lag in the rate at which the device shadowing service 220 processes the device data for storage in the local device shadow(s) 240 and the rate at which the device shadowing service 220 uploads the device data from the local device shadow(s) 240 to the service provider environment(s) 202.

The monitoring service 224 may use the computing hub information 252 captured by the computing hub information manager 222 to configure the computing hub 210. For example, when a difference between the last write marker 254 and the last sent shadow marker 256 exceeds a threshold, the monitoring service 224 may scale up or down the amount of resources of the computing hub 210 allocated to a particular process. The monitoring service 224 may increase or decrease the allocation of CPU core, memory, network bandwidth, and the like.

According to yet another example of the present technology, the monitoring service 224 may use the computing hub information 252 captured by the computing hub information manager 222 to handle events associated with the processing by the computing hub 210 with respect to the device 212. The monitoring service 224 may use a difference between the last write marker 254 and the last sent shadow marker 256 to verify whether a predetermined amount of device data has been written to the local device shadow(s) in response to the occurrence of an event to process the device data. When the difference between the last write marker 254 and the last sent shadow marker 256 indicates that the predetermined amount of device data has been reached, the monitoring service 224 may allow the event to proceed, for example, by having the device shadowing service 220 upload the device data from the local device shadow(s) 240 to the service provider environment(s) 202. The monitoring service 224 may also use the difference between the last write marker 254 and the last sent shadow marker 256 to trigger additional events related to the processing of the device data.

Referring again to FIG. 2, in one configuration, the computing hub 210 may utilize the cache service 228 for storing device reporting data or state data from the device 212, for example, while a connection to the Internet is inaccessible to communicate, for example, with the service provider environment(s) 202. When the service provider environment(s) 202 becomes accessible again, the device data or state data may be uploaded from the cache service 228 to the service provider environment(s) 202. In another example, the computing hub 210 may utilize the messaging service 230 for providing messaging between the computing hub 210 and the device 212. In yet another example, the computing hub 210 may utilize the syncing service 232 for syncing data and device shadows from the device 212 to the service provider environment(s) 202.

The various processes and/or other functionality contained within the computing hub 210 may be executed on the processor(s) 234 that are in communication with the memory module(s) 236. The term data store or "datastore" may refer to any device or combination of devices capable of storing, accessing, organizing and/or retrieving data, which may include any combination and number of data servers, relational databases, object-oriented databases, cluster storage systems, data storage devices, data warehouses, flat files and data storage configuration in any centralized, distributed, or clustered environment. The storage system components of the datastore may include storage systems such as a SAN (Storage Area Network), a virtualized storage network, volatile or non-volatile RAM, optical media, or hard-drive type media. The datastore may be representative of a plurality of datastores as can be appreciated.

The device 212 may be, for example, processor-based systems or embedded systems. The device 212 may include, but are not limited to, a desktop computer, laptop or notebook computer, tablet computer, handheld computer, workstation, network computer, or other devices with like capability. In another example, the device 212 may include IoT devices. As non-limiting examples, the device 212 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the LAN 214. Commercial devices may also be included in the definition of the device 212, including: commercial printing presses, commercial freezers, commercial kilns, commercial mixers, or other commercial equipment. The device 212 may be other types of embedded devices that provide electronic controls for a machine or system.

The LAN 214 may include any useful computing network, including an intranet, the Internet, a localized network, a wide area network, a wireless data network, or any other such network or combination thereof. Components utilized for the LAN 214 may depend at least in part upon the type of network and/or environment selected. Communication over the LAN 214 may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
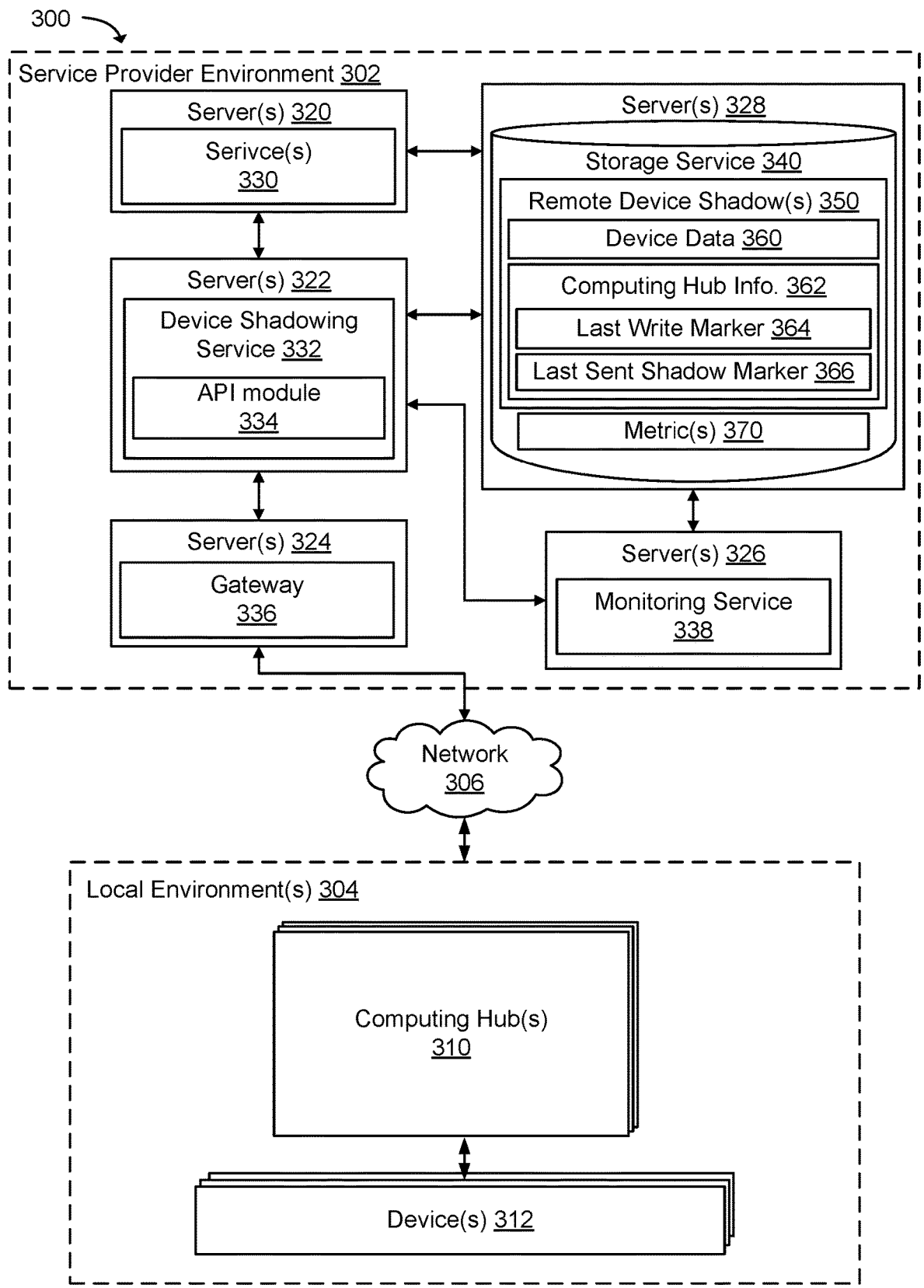
FIG. 3 is an illustration of a networked system providing management of remote device shadow data according to an example of the present technology.
Figure 4:
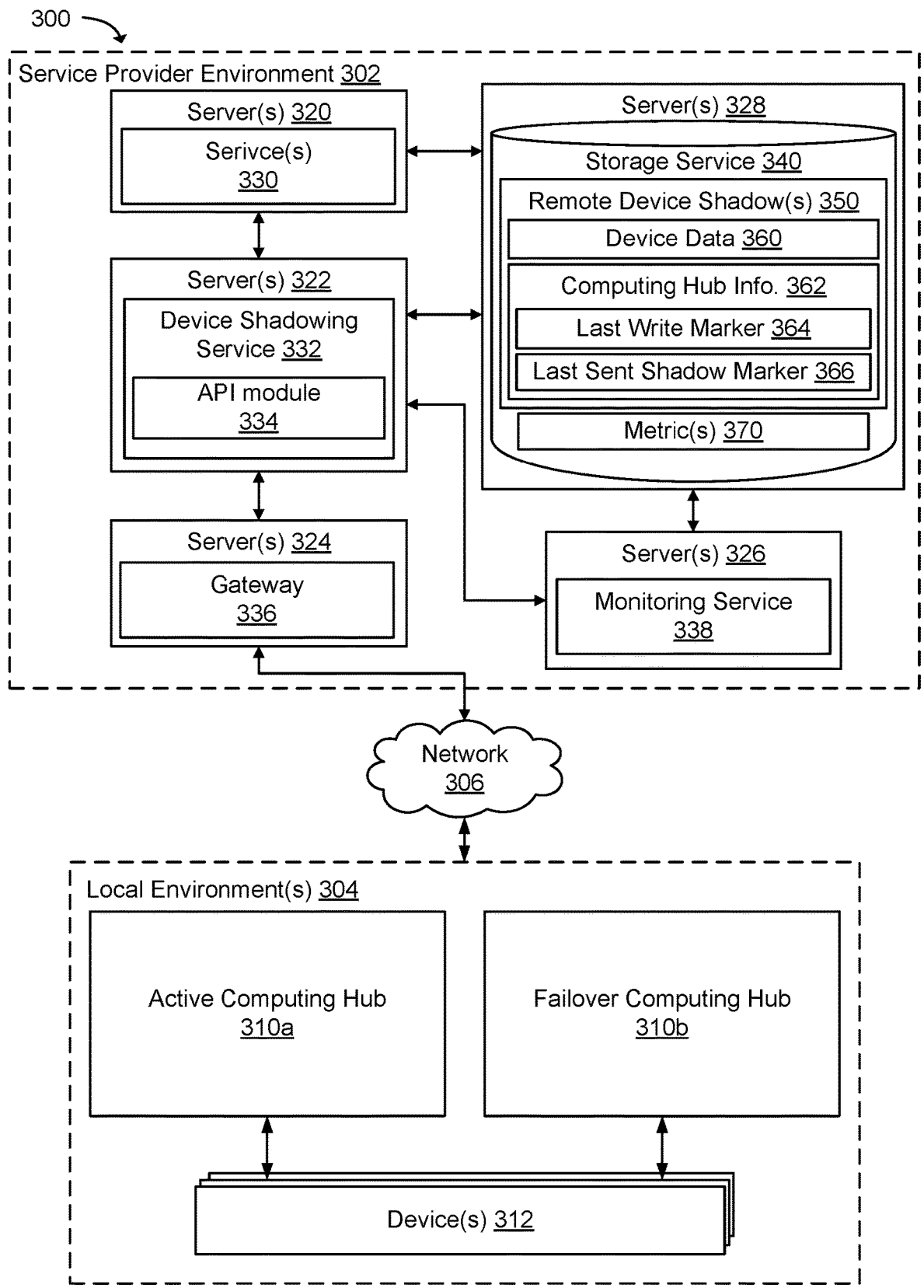
FIG. 4 is an illustration of failover between computing hubs which are part of a computing hub cluster within local environments and which utilize remote device shadows managed at a service provider environment according to an example of the present technology.

FIGS. 3 and 4—Management of Device Shadows within a Service Provider Environment FIG. 3 is an illustration of a networked system 300 providing management of remote device shadow data according to an example of the present technology. As illustrated, the networked system 300 may include a service provider environment 302, one or more local environment(s) 304, and a network 306. The networked system 300 may utilize the network 306 to provide communication between the service provider environment 302 and the local environment(s) 304. As illustrated, the local environment(s) 304 may include or more computing hub(s) 310 in communication with one or more device(s) 312.

One example of the service provider environment 302 includes a centralized service providing on-demand computing and storage resources. The service provider environment 302 may be capable of delivery of computing, storage, and networking capacity as a service to a community of end recipients. The service provider environment 302 may include a number of computing devices that are arranged, for example, in one or more server banks or computer banks or other arrangements. The computing devices may support a computing environment using hypervisors, virtual machine managers (VMMs), and other virtualization software. The computing devices may include one or more servers, such as server(s) 320, 322, 324, 326, and 328. The server(s) 320 may include one or more service(s) 330 used directly or indirectly by the computing hub(s) 310 and the device(s) 312. The server(s) 322 may include a device shadowing service 332 having an application programming interface (API) module 334 used by the computing hub(s) 310 to shadow device data received from the device(s) 312. The server(s) 324 may include a gateway 336 that facilitates long-lasting connections between the computing hub(s) 310 and the server(s) 320, 322, 324, 326, and 328 of the service provider environment 302. In addition, the server(s) 326 may include a monitoring service 338, and the server(s) 328 may include a storage service 340 that includes one or more remote device shadow(s) 350 (each with a last write marker 364 and a last sent shadow marker 366) and one or more metric(s) 370.

The service(s) 330 may be considered on-demand computing that is hosted in a server, virtualized service environment, grid or cluster computing system. Some examples of the service(s) 330 that may be provided by the service provider environment 302 may include compute services, data store services, networking services, web services, streaming services, network accessible services, software as a service, storage as a service, on-demand applications, services for the execution of code functions, and services associated with monitoring and management of device shadows.

The device shadowing service 332 may be configured to manage device shadows associated with the device(s) 312. The device shadowing service 332 may receive device data associated with the device(s) 312 via the gateway 336 from the computing hub(s) 310. The device shadowing service 332 may store the device data in the remote device shadow(s) 350, in one example, as data objects may be stored using a data-interchange format like JSON (JavaScript Object Notation) or XML (eXtensible Markup Language) in an object data store, NoSQL data store, a relational data store or another type of data store. The remote device shadow(s) 350 may be accessible to the computing hub(s) 310 that may operate outside of the service provider environment 302, and applications and/or services hosted within the service provider environment 302, such as the service(s) 330 and the monitoring service 338. Accordingly, the remote device shadow(s) 350 may be accessible via the device shadowing service 332 at any time without the need to wake up or otherwise contact the device(s) 312.

The device shadowing service 332 may be configured to store and manage device states represented by the remote device shadow(s) 350. For example, the device shadowing service 332 may update a device state represented by one of the remote device shadow(s) 350 in response to state change requests received from the computing hub(s) 310 and/or service(s) 330. The device shadowing service 332 may include the API module 334. The API module 334 may be configured to provide an endpoint to the device shadowing service 332, for example, exposing API calls to the computing hub(s) 310 and/or service(s) 330 that may store or request device data 360, which may represent a device state, associated with one or more of the remote device shadow(s) 350. Requests made to the device shadowing service 332 via the API module 334 may be authenticated using an identity and access management service (not shown) hosted in the service provider environment 302. For example, security authentication may be performed for state requests to ensure that a customer has permissions that allow the customer to obtain a device state for the remote device shadow(s) 350.

In another example, requests for the device data 360 may be sent to the device shadowing service 332 using messages published to named logical channels associated with the remote device shadow(s) 350. The service provider environment 302 may utilize the gateway 336 to exchange messages using a publication/subscription broker service, which enables one-to-one and one-to-many communications. A one-to-many communication pattern may allow an exchange of messages between the device shadowing service 332, the computing hub(s) 310, the device(s) 312, and other clients, applications, and service(s) 330, as well as other components subscribed to receive the messages. The gateway 336 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The gateway 336 may be configured to scale automatically to support any number of the device(s) 312 (thousands, millions, or even billions) using computing resources included in the service provider environment 302.

According to one example of the present technology, the service provider environment 302 may utilize the device data 360 and computing hub information 362 stored in the remote device shadow(s) 350 to perform analytics to determine performance of the computing hub(s) 310 with respect to the device(s) 312. In one example, the monitoring service 338 may include hardware and/or software elements for monitoring performance of the computing hub(s) 310 with respect to the shadowing of the device(s) 312 using the remote device shadow(s) 350. For example, the monitoring service 338 may use the computing hub information 362 to generate or analyze performance data according to t metric(s) 370 and the remote device shadow(s) 350 stored in the data store 226. Some examples of the metric(s) 370 are CPU utilization, memory utilization, storage utilization, network transfer speed or utilization, processing delays, processing backlogs, shadowing transfer delays, shadowing transfer speed, time metrics, data metrics, and the like. According to one example of the present technology, the monitoring service 338 may generate performance data for the computing hub(s) 310 with respect to the device(s) 312 by monitoring the remote device shadow(s) 350 to determine a difference between the last write marker 364 and the last sent shadow marker 366. The difference between the last write marker 364 and the last sent shadow marker 366 may represent a difference in the rate at which the computing hub(s) 310 process the device data for storage and the rate at which the computing hub(s) 310 upload the device data to the service provider environment 302. The difference between the last write marker 364 and the last sent shadow marker 366 may be represented, for example, using an amount of time lag or an amount of data lag.

According to another example of the present technology, the monitoring service 338 may use the remote device shadow(s) 350 to generate notifications about the performance of the computing hub(s) 310 with respect to the storage, upload, aggregation, transformation, and the like, of the device data 360 received from the device(s) 312. The monitoring service 338 may generate a notification when, for example, an amount of time lag or an amount of data lag in the rate at which the computing hub(s) 310 processes the device data 360 for storage and the rate at which the computing hub(s) 310 uploads the device data 360 to the service provider environment 302 exceeds a threshold. The monitoring service 338 may determine whether a difference between the last write marker 364 and the last sent shadow marker 366 satisfies a notification rule having the threshold as a condition.

According to yet another example of the present technology, the monitoring service 338 may use the remote device shadow(s) 350 to complete requests for the device data 360 and handle events to perform additional processing or transformations on the device data 360. The monitoring service 338 may use a difference between the last write marker 364 and the last sent shadow marker 366 to verify whether a predetermined amount of device data has been written to the remote device shadow(s) 350 in order to enable certain processing to occur, for example enough data is available to perform aggregation, averages, moving averages, checking thresholds, standard deviations, machine learning, and the like. When the difference between the last write marker 364 and the last sent shadow marker 366 indicates that the predetermined amount of device data has been reached, the monitoring service 338 may allow the requests for the device data 360 to be satisfied, for example, by allowing the requests to proceed or be fulfilled by the device shadowing service 332. The monitoring service 338 may also use the difference between the last write marker 364 and the last sent shadow marker 366 to trigger additional events.

Various components of the service provider environment 302 may perform verifications using the captured device information to determine whether to proceed with a process to access the device data in the remote device shadow(s) 350. For example, the service(s) 330 may provide a timed trigger to access the remote device shadow(s) 350 via the API module 334 of the device shadowing service 332 to perform one or more calculations or manipulations on new device data, such as aggregation, transformation, averages, moving averages, checking thresholds, standard deviations, machine learning, and the like. When the timed trigger occurs, the device shadowing service 332 may use the last write marker 364 and the last sent shadow marker 366 to verify, for example, whether a predetermined amount of device data has been sent in order to fulfill the timed trigger. The device shadowing service 332 may delay the timed trigger until a verification is determined using the last write marker 364 and the last sent shadow marker 366 that the predetermined amount of device data has been sent.

FIG. 4 is an illustration of failover between the computing hub(s) 310 which are part of a computing hub cluster within the local environment(s) 304 and the computing hubs 310 may utilize remote device shadows managed at a service provider environment according to an example of the present technology. In this example, an active computing hub 310a may handle the processing and storage of the device data received from the device(s) 312. The active computing hub 310a may synchronize one or more local device shadow(s) to the device shadowing service 332 in the service provider environment 302 for storage as the remote device shadow(s) 350.

In anticipation of a failure in the active computing hub 310a, a failover computing hub 310b may be provided. The failover computing hub 310b may be configured to take over the handling of the processing and storage of the device data 360 received from the device(s) 312 in the event that the active computing hub 310b is no longer operational or is inaccessible. The failover computing hub 310b may also be configured to synchronize local device shadow(s) to the device shadow service 332 in the service provider environment 302 for storage as the remote device shadow(s) 350.

In the event of a failure in the active computing hub 310a, the failover computing hub 310b may receive an indication to manage the local device shadow(s) for the device(s) 312. Accordingly, the failover computing hub 310b may contact the device shadowing service 332 in the service provider environment 302 to retrieve the computing hub information 362 captured by the active computing hub 310a and transferred to the service provider environment 302 for storage in the remote device shadow(s) 350. Therefore, the failover computing hub 310b may retrieve the last write marker 364 and the last sent shadow marker 366 from the remote device shadow(s) 350.

The failover computing hub 310b may use the last write marker 364 to determine whether device data received from the device(s) 312 has been written to a buffer associated with the local device shadow(s). For example, the failover computing hub 310b may compare timestamps of the device data 360 received from the device(s) 312 to a timestamp associated with a data entry at the last write marker 364 to verify whether the device data is to be written to the buffer. The failover computing hub 310b may use the last sent shadow marker 366 to determine whether device data written to a buffer associated with the local device shadow(s) has been sent to the device shadowing service 332 for storage in the remote device shadow(s) 350. After determining what has been done previously, the failover computing hub 310b may begin uploading the device data in the local device shadow(s) to the device shadowing service 332 for storage in the remote device shadow(s) 350 beginning at a data entry that is known to be after the last sent shadow marker 366.

Accordingly, the processing state of the active computing hub 310a with respect to the processing, storage, and uploading of the device data 360 received from the device(s) 312 can be cached in the remote device shadow(s) 350. The cached processing state (e.g., the last write marker 364 and the last sent shadow marker 366) can be used by the failover computing hub 310b to decrease the time taken to resume management of the local device shadows associated with the device(s) 312 in the event of a failure in the active computing hub 310a.

Figure 5:
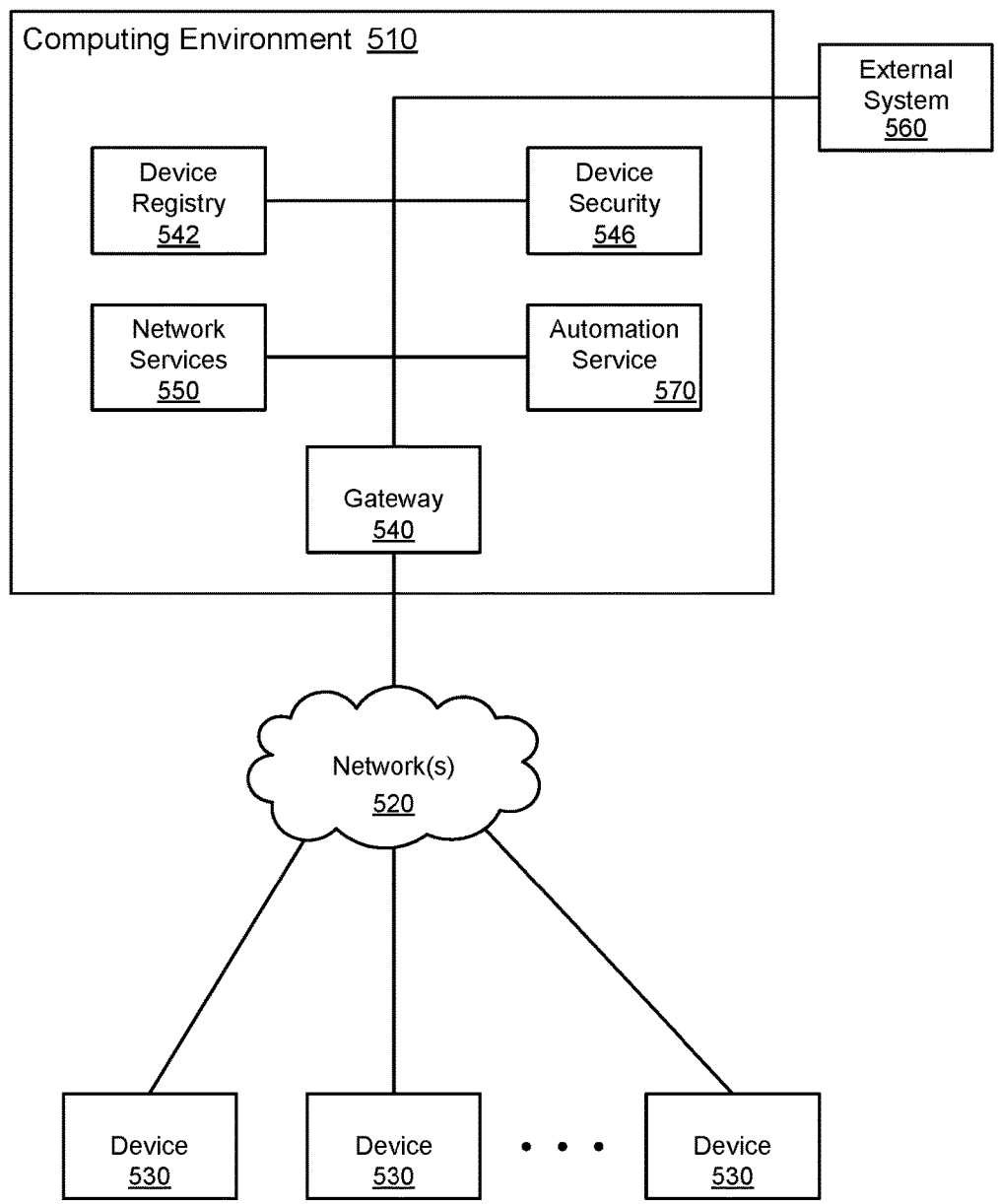
FIG. 5 is a block diagram illustrating an example computing environment providing network addressable devices access to network services according to an example of the present technology.
Figure 6:
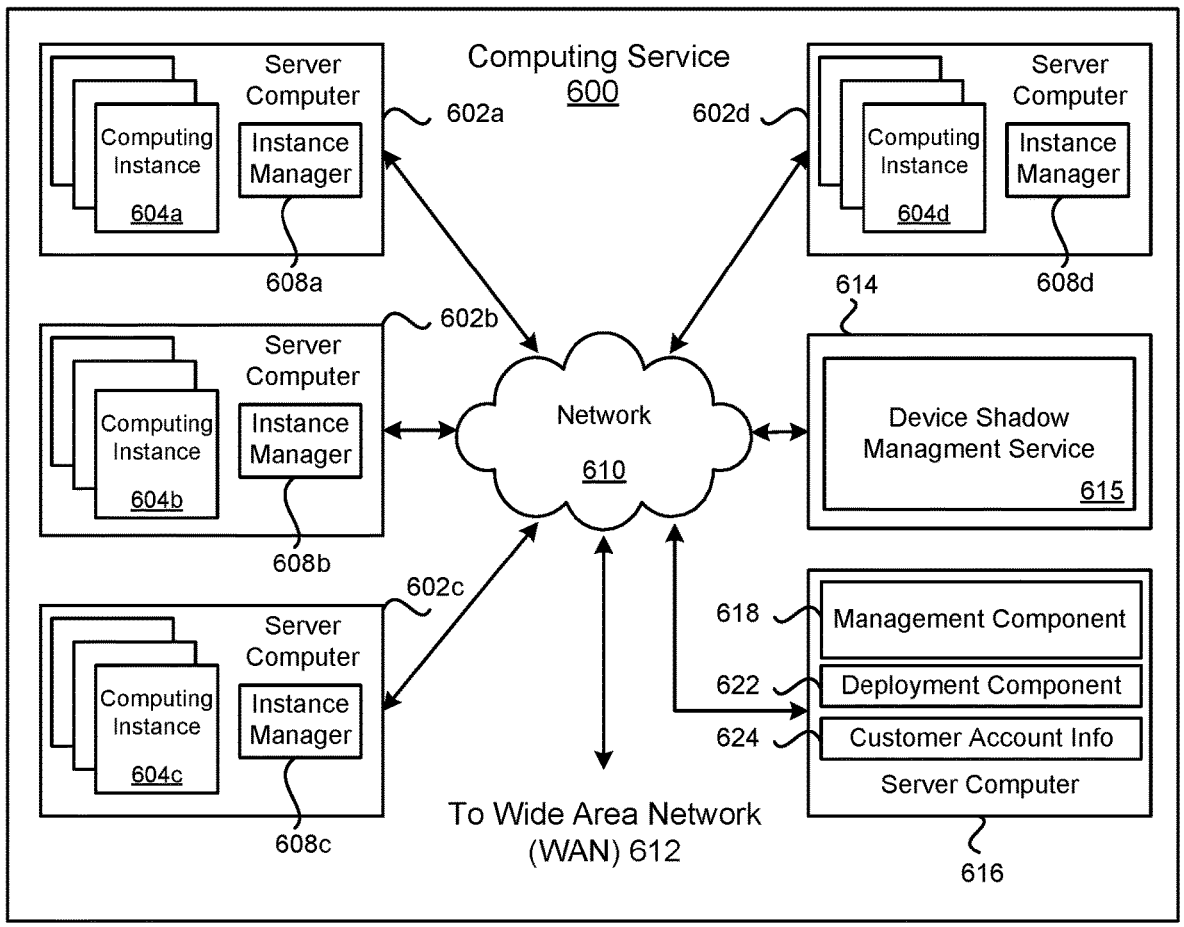
FIG. 6 a block diagram of an example computing service that may be used to execute and manage a number of computing instances upon which the present technology may execute according to an example of the present technology.

FIGS. 5 and 6—Example Local Computing Environment and Service Provider Environment FIG. 5 is a block diagram illustrating an example computing environment 500 providing network addressable devices access to network services according to an example of the present technology. The computing environment 510, which may be referred to as a device communication environment or system, comprises various resources that are made accessible via a gateway server 540 to the devices 530 that access the gateway server 540 via a network 520. The devices 530 may access the computing environment 510 in order to access services such as data storage and computing processing features. Services operating in the computing environment 510 may communicate data and messages to the devices 530 in response to requests from devices and/or in response to computing operations within the services.

The computing environment 510 comprises communicatively coupled component systems 540, 542, 546, 550 and 570 that operate to provide services to the devices 530. The gateway server 540 may be programmed to provide an interface between the devices 530 and the computing environment 510. The gateway server 540 receives requests from the devices 530 and forwards corresponding data and messages to the appropriate systems within the computing environment 510. Likewise, when systems within the computing environment 510 attempt to communicate data instructions to the devices 530, the gateway server 540 routes those requests to the correct device 530.

The gateway server 540 may be adapted to communicate with varied devices 530 using various different computing and communication capabilities. For example, the gateway server 540 may be adapted to communicate using either TCP (Transmission Control Protocol) or UDP (User Datagram Protocol) protocols. Likewise, the gateway server 540 may be programmed to receive and communicate with the devices 530 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 540 may be programmed to convert the data and instructions or messages received from the devices 530 into a format that may be used by other of the server systems comprised in the computing environment 510. In one example, the gateway server 540 may be adapted to convert a message received using the HTTPS protocol into a JSON (JavaScript Object Notation) formatted message that is suitable for communication to other servers within the computing environment 510.

The gateway server 540 may store, or may control the storing, of information regarding the devices 530 that have formed a connection to the particular gateway server 540 and for which the particular gateway server 540 may be generally relied upon for communications with the device 530. In one example, the gateway server 540 may have stored thereon information specifying the particular device 530 such as a device identifier. For each connection established from the particular device 530, the gateway server 540 may also maintain information identifying the connection. For example, a connection identifier may be generated and stored for each connection established with a particular device 530. Information relating to the particular connection may also be stored. For example, information identifying the particular socket of the gateway server 540 on which the connection was established, as well as information identifying the particular protocol used by the device 530 on the connection may be stored by the gateway server 540. Information such as the socket and protocol may be used in order to facilitate further communications via the particular connection.

In one example, the gateway server 540 may communicate via any suitable networking technology with a device registry server 542. The device registry server 542 may be adapted to track the attributes and capabilities of each device 530. In an example, the device registry server 542 may be provisioned with information specifying the attributes of the devices 530. For instance, a device 530 may be registered with the device registry by providing a device identifier and a device type for a device. In some examples, a beacon device may be registered with the device registry server 542 by providing a beacon identifier and beacon attributes for the beacon device. Beacon attributes may include latitude and longitude coordinates, indoor floor level, and a location identifier.

The automation service server 570 may comprise data specifying rules or logic (e.g., automation rules) for handling various requests that may be received from the devices 530. The automation service server 570 may be programmed to convert specialized device functions or commands received in particular communication protocols such as, for example HTTPS, MQTT, CoAP, into functions or commands using particular protocols that are understood by other of the servers in the computing environment 510. In one example, the automation service server 570 may be provisioned with information specifying that upon receipt of a particular request from a particular device 530, a request should be made to store the payload data of the request in a particular network service server 550. The automation service server 570 may be similarly programmed to receive requests from servers 542, 550 and convert those requests into commands and protocols understood by the devices 530.

The device security server 546 maintains security-related information for the devices 530 that connect to the computing environment 510. In one example, the device security server 546 may be programmed to process requests to register devices with the computing environment 510. For example, entities such as device manufacturers, may forward requests to register devices 530 with the computing environment 510. The device security server 546 receives registration requests and assigns unique device identifiers to devices 530 which use the device identifiers on subsequent requests to access the computing environment 510. The device security server 546 stores, for each registered device, authentication information that may be provided during the device registration process. For example, a request to register a device 530 may comprise information identifying the device 530 such as a device serial number and information for use in authenticating the device 530. In one example, the information may comprise a digital certificate and may comprise a public key of a public key-private key pair. The information may be stored in relation to the assigned device identifier for the particular device 530. When the device 530 subsequently attempts to access the computing environment 510, the request may be routed to the device security server 546 for evaluation. The device security server 546 determines whether authentication information provided in the request is consistent with the authentication information stored in relation to the device identifier and provided during the registration process.

The device security server 546 may be further programmed to process request to associate particular entities (individuals or organizations) with particular devices 530. The device security server 546 may be adapted to receive requests to register entities, which may be, for example, individuals, users, accounts, and/or organizations, as authorized to control or communicate with a particular device 530. In one example, a request may be received from an individual or organization that may have purchased a device 530 from a manufacturer. For example, the device may be a dishwasher, thermostat, or lighting assembly that an individual or organization purchased from the manufacturer. The individual or organization may initiate a request to register the device 530 with the individual or an organization with which the organization is associated. The request may be routed to a web services server which may be comprised in computing environment 510 or which communicates the request to the computing environment 510. The request identifies the device 530 and the particular entity (individual or organization) that is requesting to be associated with the device 530. In one example, the request may comprise a unique device identifier that was assigned when the device 530 was registered with the system. The request further may comprise information uniquely identifying the entity that is registering as having authority to communicate with and/or control the particular device 530.

The device security server 546 stores the information identifying the particular entity in relation with the device identifier. When the particular entity subsequently attempts to control or communicate data to the particular device 530, the device security server 546 may use the information to confirm that the particular entity is authorized to communicate with or control the particular device 530. When an entity that has not been registered as being authorized to communicate with the device 530 attempts to communicate with or control the device 530, the device security server 546 may use the information stored in the device security server 546 to deny the request.

A network services server 550 may be any resource or processing server that may be used by any of servers 540, 542, 546, or 570 in processing requests from the devices 530. In one example, network services server 550 may provide data storage and retrieval services and/or on-demand processing capacity. In an example scenario, the network services server 550 may be any of numerous network accessible services including, for example, web or cloud-based services. In one example, the web services server 550 may be programmed to provide particular processing for particular devices 530 and/or groups of devices 530. For example, a network services server 550 may be provisioned with software that coordinates the operation of a particular set of devices 530 that control a particular manufacturing operation.

Servers 540, 542, 546, 550, and 570 may be communicatively coupled via any suitable networking hardware and software. For example, the servers may communicate via a local area network or wide area network.

An external system 560 may access computing environment 510 for any number of purposes. In one example, an external system 560 may be a system adapted to forward requests to register devices 530 with the computing environment 510. For example, an external system 560 may be a server operated by or for a device manufacturer that sends requests to computing environment 510, and device security server 546 in particular, to register devices 530 for operation with computing environment 510. Similarly, the external system 560 may be a system operated to provide a gateway for entities (individuals or organizations) to register an ownership or control relationship with a particular device 530.

The devices 530 may be any devices that may be communicatively coupled via a network 520 with the computing environment 510. For example, the devices 530 may be computing devices such as smart phones and tablet computers, automobiles, appliances such as washers and driers, industrial sensors, switches, control systems, etc. In one example, each of devices 530 may communicate over the network 520 to store data reflecting the operations of the particular device 530 and/or to request processing provided by, for example, network services server 550. While FIG. 5 depicts three devices 530, it will be appreciated that any number of devices 530 may access the computing environment 510 via the gateway server 540. Further it will be appreciated that the devices 530 may employ various different communication protocols. For example, some devices 530 may transport data using TCP, while others may communicate data using UDP. Some devices 530 may use MQTT, while others may use CoAP, and still others may use HTTPs. It will also be appreciated that each of devices 530 may be programmed to send and receive particular functions or commands in its requests that are not compatible with other devices or even the systems within computing environment 510. The gateway server 540 may be programmed to receive and, if needed, attend to converting such requests for processing with the computing environment 510.

FIG. 6 is a block diagram illustrating an example computing service 600 that may be used to execute and manage a number of computing instances 604*a-d* upon which the present technology may execute. In particular, the computing service 600 depicted illustrates one environment in which the technology described herein may be used. The computing service 600 may be one type of environment that includes various virtualized service resources that may be used, for instance, to host computing instances 604*a-d*.

The computing service 600 may be capable of delivery of computing, storage, and networking capacity as a software service to a community of end recipients. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service

600 may provide the following models: Infrastructure as a Service ("IaaS"), Platform as a Service ("PaaS"), and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 600. End customers may access the computing service 600 using networked client devices, such as desktop computers, laptops, tablets, smartphones, etc., running web browsers or other lightweight client applications, for example. Those familiar with the art will recognize that the computing service 600 may be described as a "cloud" environment.

The particularly illustrated computing service 600 may include a plurality of server computers 602*a-d*. The server computers 602*a-d* may also be known as physical hosts. While four server computers are shown, any number may be used, and large data centers may include thousands of server computers. The computing service 600 may provide computing resources for executing computing instances 604*a-d*. Computing instances 604*a-d* may, for example, be virtual machines. A virtual machine may be an instance of a software implementation of a machine (i.e. a computer) that executes applications like a physical machine. In the example of a virtual machine, each of the server computers 602*a-d* may be configured to execute an instance manager 608*a-d* capable of executing the instances. The instance manager 608*a-d* may be a hypervisor, virtual machine manager (VMM), or another type of program configured to enable the execution of multiple computing instances 604*a-d* on a single server. Additionally, each of the computing instances 604*a-d* may be configured to execute one or more applications.

A server computer 614 may be reserved to execute software components for implementing the present technology or managing the operation of the computing service 600 and the computing instances 604*a-d*. For example, the server computer 614 may execute a device shadow management service 615 operable to monitor device shadows and perform analytics using device information captured during processing by computing hubs and device data received from devices. The device shadow management service 615 may determine a write and shadowing upload status of the device data using a last write marker representing a last data entry written to a buffer in a computing hub associated with a device shadow and a last sent shadow marker representing a last data entry of the buffer sent to a device shadowing service in a service provider environment. As a result, the device shadow management service 615 may enable local restarts by computing hubs to handle device shadows, failover use cases between computing hubs, and local and remote analytics on the performance of computing hubs with respect to device data received from devices.

A server computer 616 may execute a management component 618. A customer may access the management component 618 to configure various aspects of the operation of the computing instances 604*a-d* purchased by a customer. For example, the customer may setup computing instances 604*a-d* and make changes to the configuration of the computing instances 604*a-d*.

A deployment component 622 may be used to assist customers in the deployment of computing instances 604*a-d*. The deployment component 622 may have access to account information associated with the computing instances 604*a-d*, such as the name of an owner of the account, credit card information, country of the owner, etc. The deployment component 622 may receive a configuration from a customer that includes data describing how computing instances 604*a-d* may be configured. For example, the configuration may include an operating system, provide one or more applications to be installed in computing instances 604*a-d*, provide scripts and/or other types of code to be executed for configuring computing instances 604*a-d*, provide cache logic specifying how an application cache is to be prepared, and other types of information. The deployment component 622 may utilize the customer-provided configuration and cache logic to configure, prime, and launch computing instances 604*a-d*. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 600 and the server computers 602*a-d*, 616. The network 610 may be a local area network (LAN) and may be connected to a Wide Area Network (WAN) 612 or the Internet, so that end customers may access the computing service 600. In addition, the network 610 may include a virtual network overlaid on the physical network to provide communications between the server computers 602*a-d*. The network topology illustrated in FIG. 6 has been simplified, as many more networks and networking devices may be utilized to interconnect the various computing systems disclosed herein.

Figure 7:
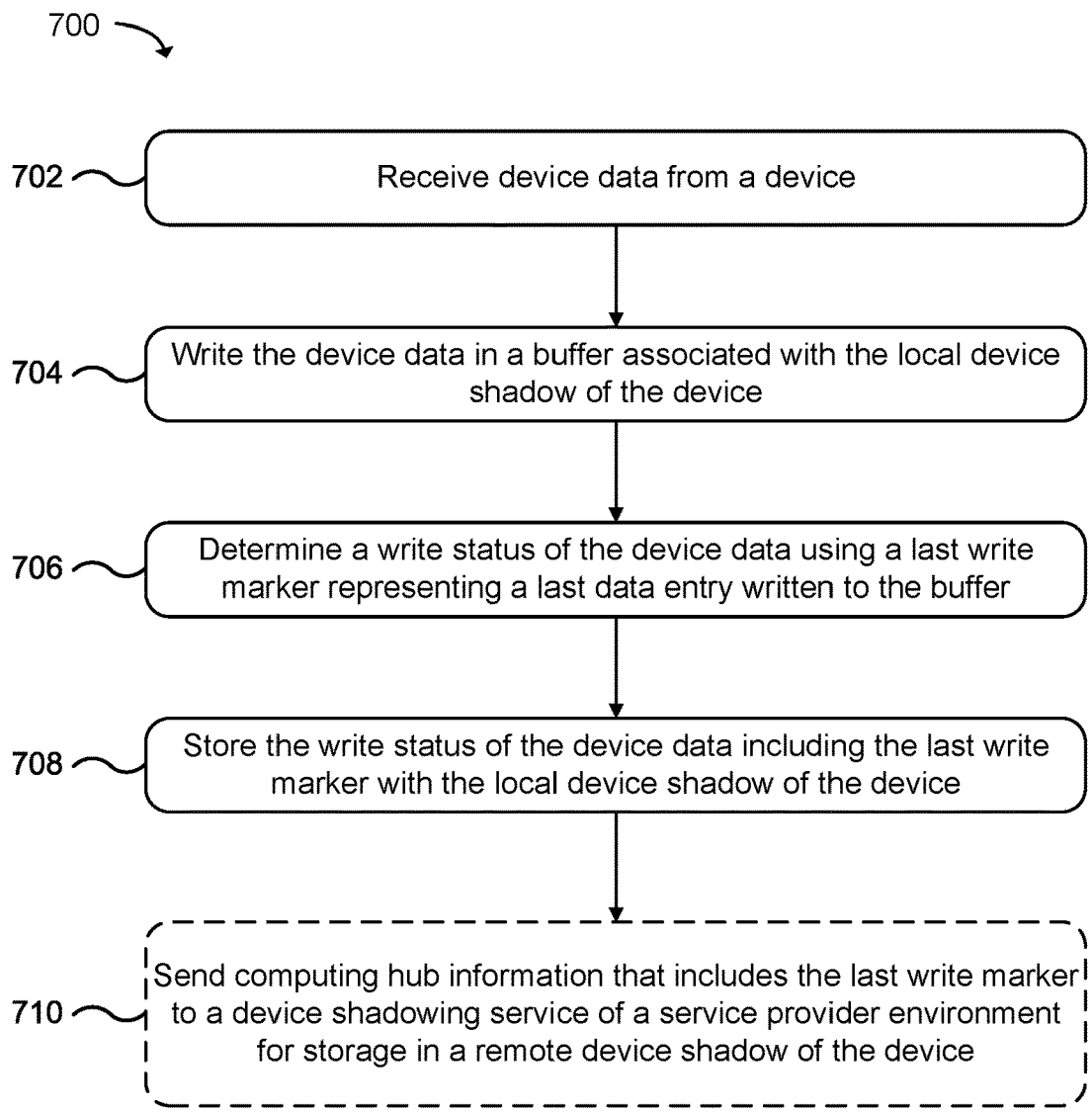
FIG. 7 is a flowchart of a method for performing management for shadowing of data using a write status of device data obtained from a device according to an example of the present technology.
Figure 8:
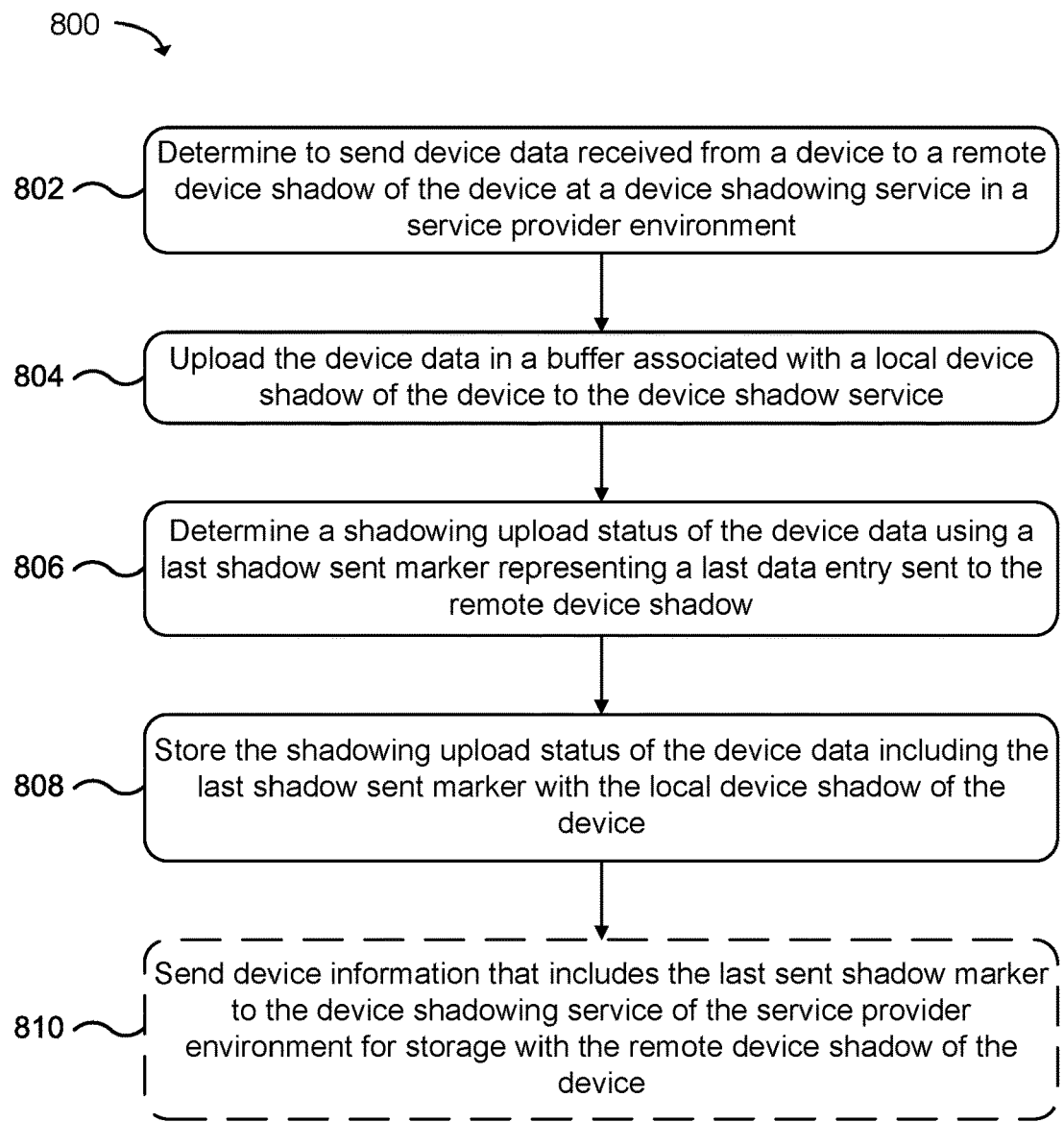
FIG. 8 is a flowchart of a method for performing management for shadowing of data using a shadowing upload status of device data sent to a device shadowing service in a service provider environment according to an example of the present technology.

FIGS. 7 and 8—Local Storage Management for Device Shadows

FIG. 7 is a flowchart of a method 700 for performing shadowing management for device data using a write status of device data obtained from a device, in an example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, a computing hub may receive device data from a device. For example, the computing hub may include a client subscribed to receive the device data in MQTT messages. In another example, the computing hub may periodically poll the device for new data. One or more components of the computing hub may process the device data for storage. For example, the computing hub may include a device shadowing service that maintains a local device shadow for the device.

In operation 704, the computing hub may write the device data in a buffer associated with the local device shadow of the device. The computing hub may update a device state represented by a local device shadow in response to the instruction. In response, the device shadowing service may be configured to update the device state of the local device shadow to the desired state.

In operation 706, the computing hub may determine a write status of the device data using a last write marker representing a last data entry written to the buffer. The write status may identify the last data entry written to the buffer, where the last data entry was written, when the last data entry was written, and the like. The computing hub may track the last write marker to determine the write status. Some examples of the last write marker may include a pointer to the last data entry, a hash of the last data entry, an address in the buffer, a timestamp of the last data entry, and the like.

In operation 708, the computing hub may store the write status of the device data including the last write marker with the local device shadow of the device. The computing hub may instruct the device shadowing service to include the write status of the device data in the local device shadow. For example, the computing hub may instruct the device shadowing service to include the write status of the device data in metadata associated with the local device shadow.

In optional operation 710, the computing hub may send device information that includes the last write marker to a device shadowing service of a service provider environment for storage in a remote device shadow of the device. The computing hub may instruct the device shadowing service in the service provider environment to include the write status of the device data in the remote device shadow. The computing hub may instruct the device shadowing service in the service provider environment to include the write status of the device data in metadata associated with the remote device shadow.

FIG. 8 is a flowchart of a method 800 for performing shadowing of an upload status of device data sent to a device shadowing service in a service provider environment an example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 802, a computing hub may determine to send device data from a device to a remote device shadow of the device at a device shadowing service in a service provider environment. The computing hub may receive an instruction from one or more components of the computing hub processing storage of the device data. For example, the computing hub may include a timed service that periodically instructs a device shadowing service of the computing hub to upload device data to the service provider environment. In another example, the service provider environment may periodically poll the computing hub for new data.

In operation 804, the computing hub may upload the device data in the buffer associated with a local device shadow of the device to the device shadow service. The computing hub may select one or more data entries to upload to the device shadow service. In response, the device shadowing service may be configured to send the date entries in the local device shadow to the device shadow service for shadowing in the remote device shadow.

In operation 806, the computing hub may determine a shadowing upload status of the device data using a last sent shadow marker representing a last data entry sent to the remote device shadow. The shadowing upload status may identify the last data entry sent to the device shadowing service in the service provider environment, from a location in the buffer from where the last data entry was sent, when the last data entry was sent, and the like. The shadowing upload status may also include performance data, such as CPU and memory utilization, associated with the computing hub. The computing hub may track the last sent shadow marker to determine the shadowing upload status. Some examples of the last sent shadow marker may include a pointer to the last data entry sent, a hash of the last data entry sent, an address in the buffer of the last data entry sent, a timestamp of the last data entry sent, and the like.

In operation 808, the computing hub may store the shadowing upload status of the device data including the last sent shadow marker with the local device shadow of the device. The computing hub may instruct the device shadowing service to include the shadowing upload status of the device data in the local device shadow. Also, the computing hub may instruct the device shadowing service to include the shadowing upload status of the device data in metadata associated with the local device shadow.

In an optional operation 810, the computing hub may send device information that includes the last sent shadow marker to the device shadowing service of the service provider environment for storage with the remote device shadow of the device. The computing hub may instruct the device shadowing service in the service provider environment to include the shadowing upload status of the device data in the remote device shadow. The computing hub may instruct the device shadowing service in the service provider environment to include the shadowing upload status of the device data in metadata associated with the remote device shadow.

Figure 9:
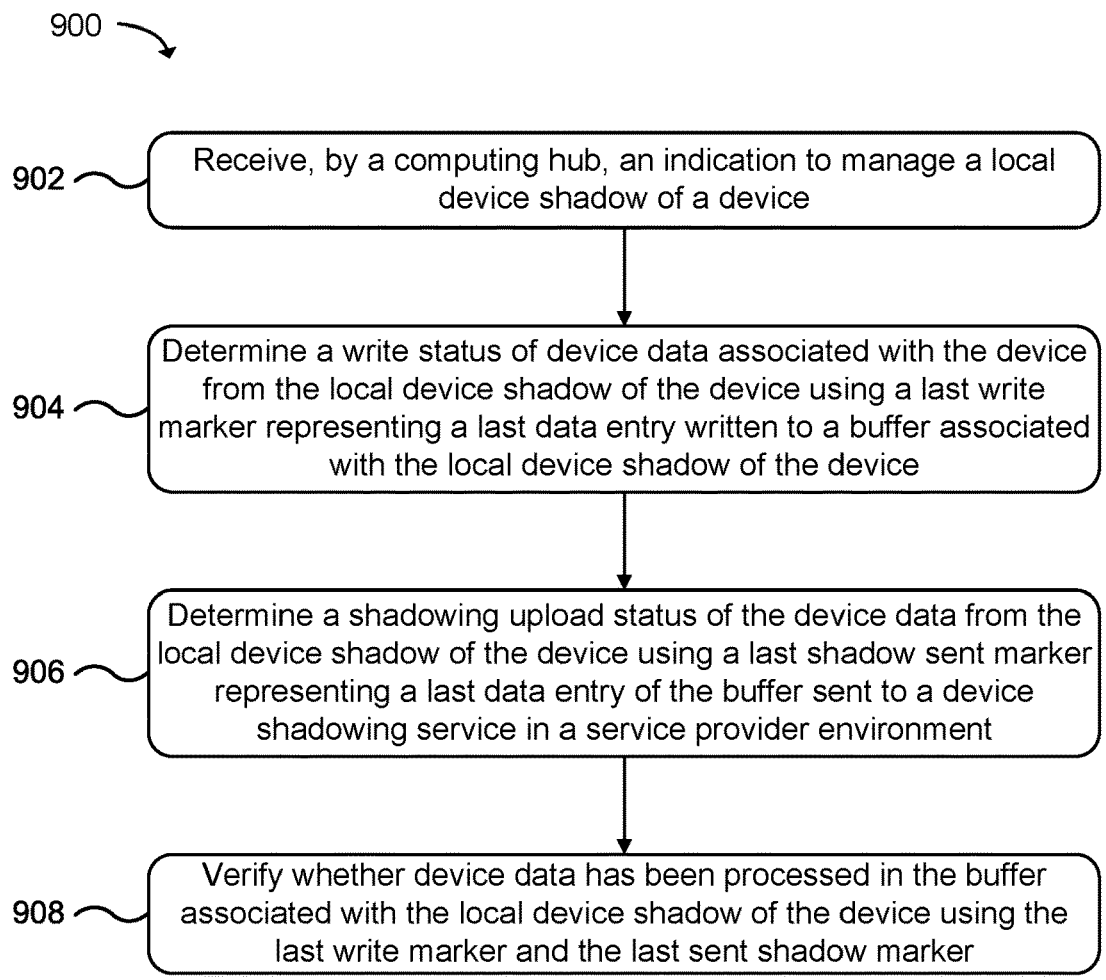
FIG. 9 is a flowchart of a method for management of shadowing of a local device shadow of a device at a computing hub in the event of a reboot by using a write status and a shadowing upload status of device data obtained from the local device shadow according to an example of the present technology.
Figure 10:
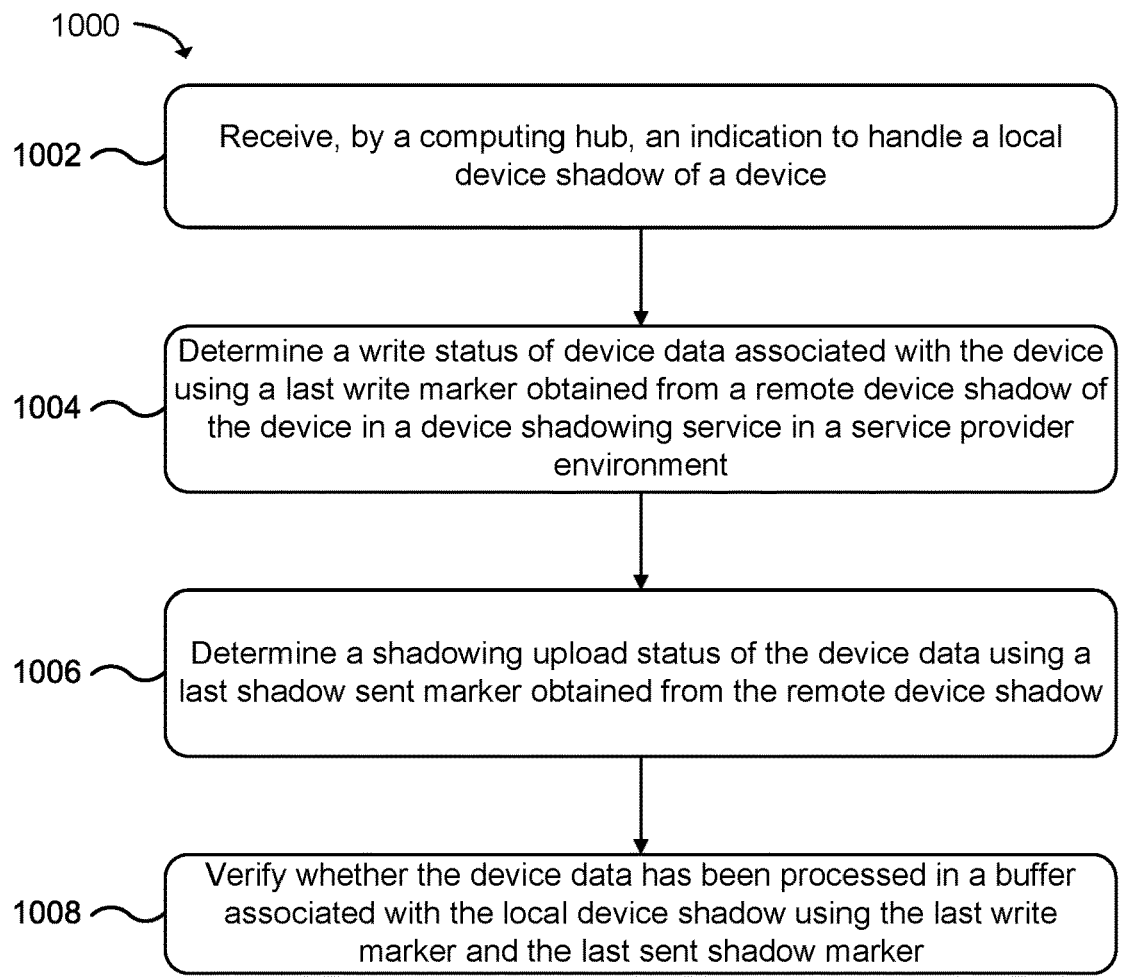
FIG. 10 is a flowchart of a method for management of shadowing of a local device shadow of a device at a computing hub in the event of a failure in another computing hub by using a write status and a shadowing upload status of device data obtained from a remote device shadow of the device in a service provider environment according to an example of the present technology.

FIGS. 9 and 10—Local Restart and Failovers Using Device Information Captured in Device Shadows FIG. 9 is a flowchart of a method 900 for management of shadowing for a local device shadow of a device at a computing hub in the event of a reboot by using a write status and a shadowing upload status of device data obtained from the local device shadow in an example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 902, a computing hub may receive an indication to manage a local device shadow of a device. The indication may be received in response to a reboot of the computing hub. In another example, the indication may be received in response to a restart to one or more processes storing the device data received from the devices due to a computing interruption event.

In operation 904, the computing hub may determine a write status of device data associated with the device from the local device shadow of the device using a last write marker representing a last data entry written to a buffer associated with the local device shadow of the device. The computing hub may retrieve the last write marker from the local device shadow of the device. The computing hub may determine the write status using the last write marker by identifying the last data entry written to the buffer, where the last data entry was written, when the last data entry was written, and the like.

In operation 906, the computing hub may determine a shadowing upload status of the device data from the local device shadow of the device using a last sent shadow marker representing a last data entry of the buffer sent to a device shadowing service in a service provider environment. The computing hub may retrieve the last sent shadow marker from the local device shadow of the device. The computing hub may determine the shadowing upload status using the last sent shadow marker by identifying the last data entry sent to the device shadowing service in the service provider environment, by identifying a location in the buffer from where the last data entry was sent, by identifying when the last data entry was sent, and the like.

In operation 908, the computing hub may verify whether device data in the buffer associated with the local device shadow of the device has been processed using the last write marker and the last sent shadow marker. The computing hub may verify that some data has already been written to the buffer using the last write marker. The computing hub may determine where to begin writing new data to the buffer using the last write marker. In another example, the computing hub may determine where to begin sending data in the buffer to the device shadowing service in the service provider environment using the last sent shadow marker.

FIG. 10 is a flowchart of a method 1000 for management of shadowing of a local shadow of a device at a computing hub in the event of a failure in another computing hub by using a write status and a shadowing upload status of device data obtained from a remote device shadow of the device in a service provider environment according to an example of the present technology. The method 1000 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1002, a computing hub may receive an indication to manage a local device shadow of a device. The indication may be received in response to a failure of another computing hub. In another example, the indication may be received in response to a restart to one or more processes transferred to the computing hub from another computing hub to handle storage of the device data received from the devices.

In operation 1004, the computing hub may determine a write status of device data associated with the device using a last write marker obtained from a remote device shadow of the device in a device shadowing service in a service provider environment. The computing hub may determine the write status using the last write marker by identifying the last data entry written to the buffer, by identifying where the last data entry was written, by identifying when the last data entry was written, and the like.

In operation 1006, the computing hub may determine a shadowing upload status of the device data using a last sent shadow marker obtained from the remote device shadow. The computing hub may retrieve the last sent shadow marker from the remote device shadow of the device. The computing hub may determine the shadowing upload status using the last sent shadow marker by identifying the last data entry sent to the device shadowing service in the service provider environment, by identifying a location in the buffer from where the last data entry was sent, by identifying when the last data entry was sent, and the like.

In operation 1008, the computing hub may verify whether device data has been processed in a buffer associated with a local device shadow of the device using the last write marker and the last sent shadow marker. The computing hub may verify that some data has already been written to the buffer using the last write marker. The computing hub may determine where to begin writing new data to the buffer using the last write marker. In another example, the computing hub may determine where to begin sending data in the buffer to the device shadowing service in the service provider environment using the last sent shadow marker.

Figure 11:
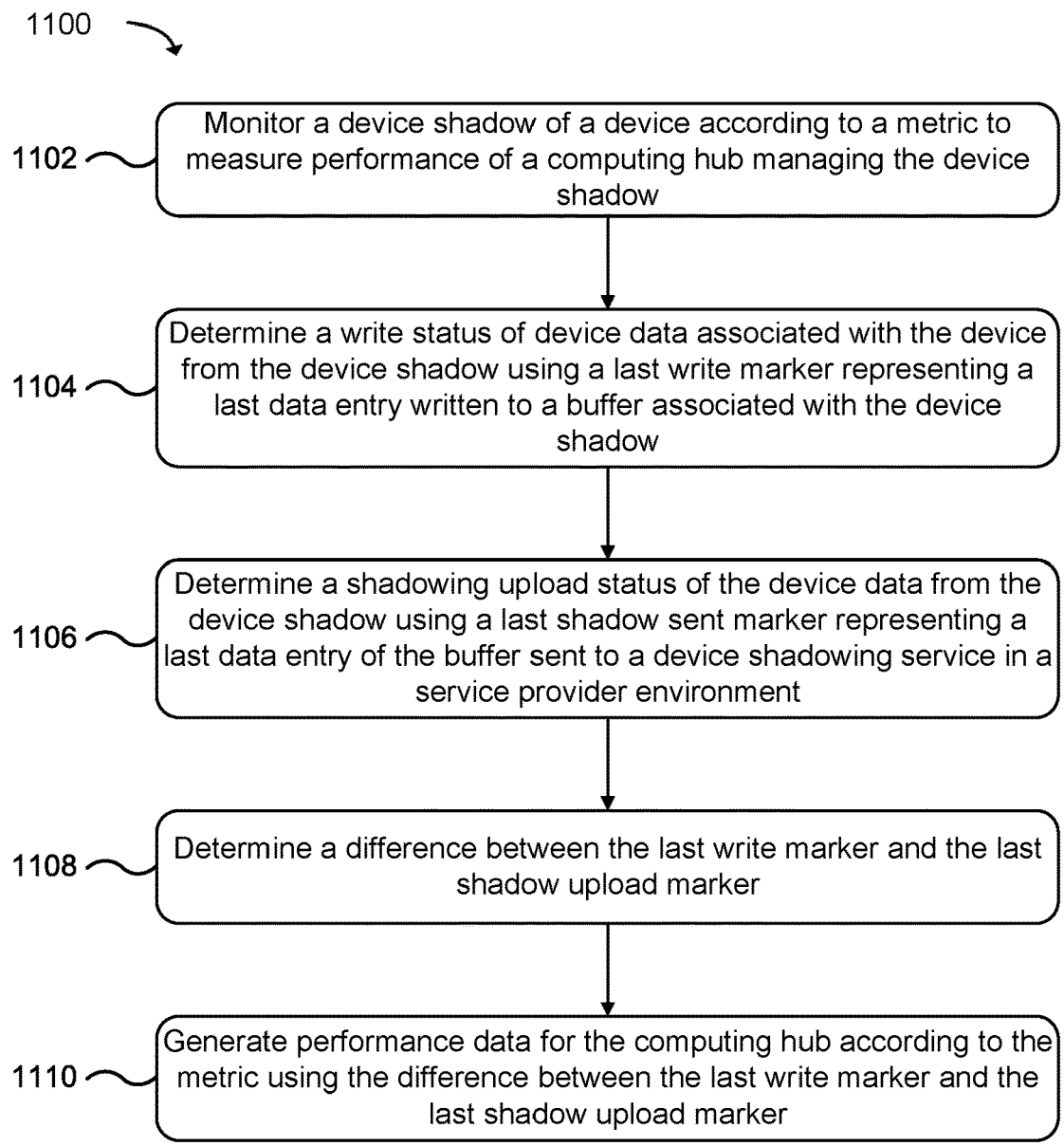
FIG. 11 is a flowchart of a method for generating performance data associated with a computing hub with respect to data written and shadowed for a device using a write status and a shadowing upload status of device data obtained from a device shadow of the device according to an example of the present technology.

FIG. 11—Measuring Performance Using Device Shadows

FIG. 11 is a flowchart of a method 1100 for generating performance data associated with a computing hub with respect to data written and shadowed for a device using a write status and a shadowing upload status of device data obtained from a device shadow of the device in an example of the present technology. The method 1100 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1102, a monitoring service may monitor a device shadow according to a metric to measure performance of a computing hub managing the device shadow. The monitoring service may be a local module of the computing hub or hosted in a service provider environment. The device shadow may be a local device shadow or a remote device shadow. The metric may include one or measurements representing the performance of the computing hub. Some examples of the metric may include a measure of: an amount of time, data, bandwidth, delay, hardware/software utilization, etc.

In operation 1104, the monitoring service may determine a write status of device data associated with the device as obtained from a device shadow of the device using a last write marker representing a last data entry written to a buffer associated with the device shadow of the device. The monitoring service may determine the write status using the last write marker to identify the last data entry written to the buffer, where the last data entry was written, when the last data entry was written, and the like.

In operation 1106, the monitoring service may determine a shadowing upload status of the device data from the device shadow using a last sent shadow marker representing a last data entry of the buffer sent to a device shadowing service in a service provider environment. The monitoring service may determine the shadowing upload status using the last sent shadow marker to identify the last data entry sent to the device shadowing service in the service provider environment, by identifying a location in the buffer from where the last data entry was sent, by identifying when the last data entry was sent, and the like.

In operation 1108, the monitoring service may determine a difference between the last write marker and the last shadow upload marker. The monitoring service may determine a difference represented between the two markers in the amount of time, amount of data, amount utilization, and the like.

In operation 1110, the monitoring service may generate performance data for the computing hub according to the metric using the difference between the last write marker and the last shadow upload marker. In one example, the monitoring service may generate performance data to quantify the amount of time delay between when the computing hub writes device data to the device shadow and when the computing hub transfers the device data to the device shadowing service in the service provider environment. In another example, the monitoring service may generate performance data to quantify the amount of data the computing hub has stored in the device shadow and has yet to transfer to the device shadowing service in the service provider environment.

The monitoring service may allow customers to view the performance of the computing hub with respect the device in a dashboard. The dashboard may provide visualizations of the performance data generated by the monitoring service using analytics applied to the markers in the device shadow. The monitoring service may further provide notifications in the dashboard with respect to the data written and shadowed for the device by the computing hub. The monitoring service may also provide recommendations with respect to the data written and shadowed for the device by the computing hub that one or more hardware resources of the computing hub be modified (e.g., reconfigured, upgraded, scaled, etc.)

Figure 12:
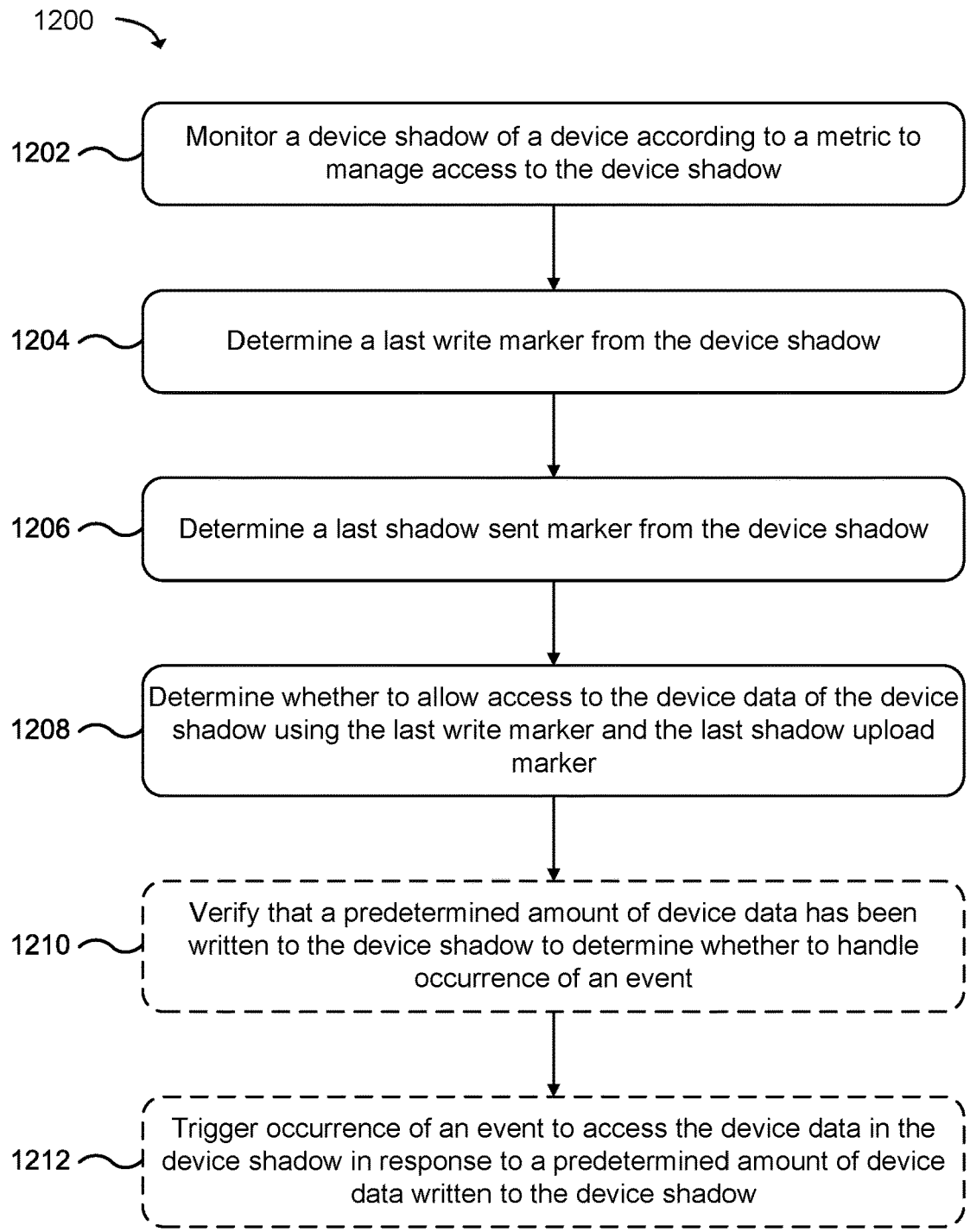
FIG. 12 is a flowchart of a method for monitoring a device shadow of a device to manage the device shadow using a write status and a shadowing upload status of device data obtained according to an example of the present technology.

FIG. 12—Managing Access to Device Shadows

FIG. 12 is a flowchart of a method 1200 for monitoring a device shadow of a device to manage access to the device shadow by using a write status and a shadowing upload status of device data in an example of the present technology. The method 1200 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1202, a monitoring device monitors a device shadow of a device according to a metric to manage access to the device shadow. The monitoring service may monitor the device shadow for updates to the device and in the states of the device associated with the device shadow. The monitoring service may monitor the device shadow for changes in one or more markers in computing hub information included in the device shadow.

In operation 1204, the monitoring service may determine a last write marker from the device shadow. In operation 1206, the monitoring service may determine a last sent shadow marker from the device shadow. In operation 1208, the monitoring service may determine whether to allow access to the device data of the device shadow using the last write marker and the last shadow upload marker.

For example, an application or service may be scheduled every five (5) minutes to access the device data in the device shadow to perform one or more operations, such as aggregations, transformations, etc., on the device data. The application or service may request access to the device data every five minutes irrespective of whether there is new data or sufficient data in the device shadow. In an optional operation 1210, the monitoring service may use the last write marker and the last shadow upload marker to verify whether a predetermined or sufficient amount of data has been written to the device shadow or uploaded to the service provider environment in order to allow the application or service to proceed with access to the device data. The monitoring service may deny the application or service access to the device data, if a sufficient amount of data is not available in the device shadow.

In an optional operation 1212, the monitoring service may use the last write marker and the last shadow upload marker to trigger occurrence of an event to access the device data in the device shadow in response to a predetermined amount of device data written to the device shadow. For example, the monitoring service may trigger the event on-demand when a sufficient amount of data is available in the device shadow.

Figure 13:
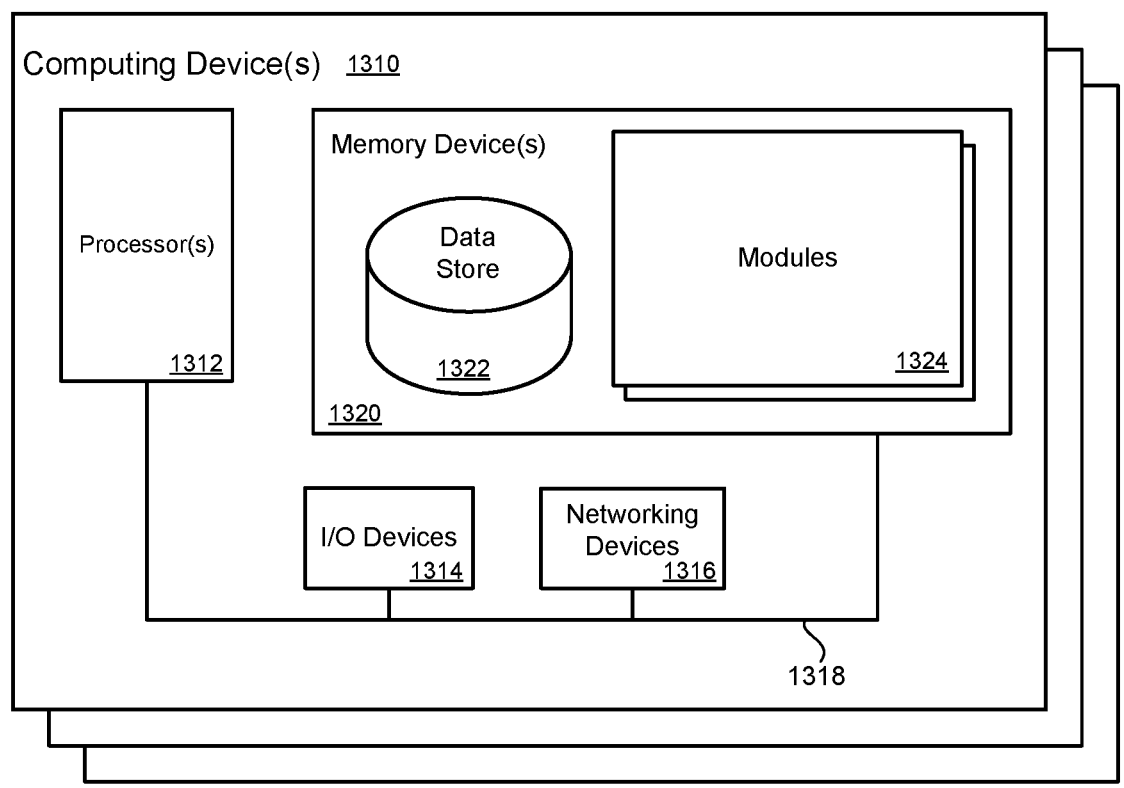
FIG. 13 is a block diagram that provides an example illustration of a computing device that may be employed according to an example of the present technology.

FIG. 13—Example Computing Device

FIG. 13 illustrates one or more computing device(s) 1310 on which modules or code components of this technology may execute. A first computing device 1310 is illustrated on which a high-level example of the technology may be executed. The first computing device 1310 may include one or more processor(s) 1312 that are in communication with memory device(s) 1320. The computing device may include a local communication interface 1318 for the components in the computing device. For example, the local communication interface may be a local data bus and/or any related address or control busses as may be desired.

The memory device(s) 1320 may contain modules 1324 or code components that are executable by the processor(s) 1312 and data for the modules 1324. The modules 1324 may execute the functions described earlier. A data store 1322 may also be located in the memory device(s) 1320 for storing data related to the modules 1324 and other applications along with an operating system that is executable by the processor(s) 1312.

Other applications may also be stored in the memory device(s) 1320 and may be executable by the processor(s) 1312. Components or modules discussed in this description that may be implemented in the form of software using high programming level languages that are compiled, interpreted, or executed using a hybrid of the methods.

The computing device may also have access to I/O (input/output) devices 1314 that are usable by the computing devices. An example of an I/O device is a display screen that is available to display output from the computing devices. Other known I/O device may be used with the computing device as desired. The networking devices 1316 and similar communication devices may be included in the computing device. The networking devices 1316 may be wired or wireless networking devices that connect to the internet, a LAN, WAN, or other computing network.

The components or modules that are shown as being stored in the memory device(s) 1320 may be executed by the processor(s) 1312. The term "executable" may mean a program file that is in a form that may be executed by a processor(s) 1312. For example, a program in a higher-level language may be compiled into machine code in a format that may be loaded into a random-access portion of the memory device(s) 1320 and executed by the processor(s) 1312, or source code may be loaded by another executable program and interpreted to generate instructions in a random-access portion of the memory to be executed by a processor. The executable program may be stored in any portion or component of the memory device(s) 1320. For example, the memory device(s) 1320 may be random access memory (RAM), read only memory (ROM), flash memory, a solid-state drive, memory card, a hard drive, optical disk, floppy disk, magnetic tape, or any other memory components.

The processor(s) 1312 may represent multiple processors and the memory 1320 may represent multiple memory units that operate in parallel to the processing circuits. This may provide parallel processing channels for the processes and data in the system. The local communication interface 1318 may be used as a network to facilitate communication between any of the multiple processors and multiple memories. The local communication interface 1318 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:
1. A computing hub, comprising:
   a processor; and
   a memory to store instructions which when executed by the processor cause the processor to:
      write device data received from a device to a buffer associated with a local device shadow of the device;
      determine a write status of the device data using a last write marker representing a last data entry written to the buffer;
      determine a shadowing upload status of the device data using a last sent shadow marker representing a last data entry sent from the buffer over a network to a device shadowing service in a service provider environment for storage in a remote device shadow of the device;
      store computing hub information that includes the last write marker and the last sent shadow marker to the local device shadow of the device; and
      send the computing hub information that includes the last write marker and the last sent shadow marker over the network to the device shadowing service of the service provider environment to be shadowed in the remote device shadow of the device to enable other computing hubs to manage the local device shadow of the device due to a computing failure event in the computing hub.

2. The computing hub of claim 1, wherein the instructions cause the processor to further:
receive an instruction to manage the local device shadow of the device due to a computing failure event in another computing hub;
receive the computing hub information that includes the last write marker and the last sent shadow marker from the remote device shadow at the service provider environment;
verify whether the device data received from the device has been written to the buffer associated with the local device shadow of the device using the last write marker; and
send the device data written to the buffer to the device shadowing service in the service provider environment as defined by the last sent shadow marker to be shadowed in the remote device shadow of the device.

3. The computing hub of claim 1, wherein the instructions cause the processor to further:
receive an instruction to manage the local device shadow of the device due to a computing interruption event in the computing hub;
receive the computing hub information that includes the last write marker and the last sent shadow marker from the local device shadow of the device;
verify whether the device data received from the device has been written to the buffer associated with the local device shadow of the device using the last write marker; and
send the device data written to the buffer to the device shadowing service in the service provider environment as defined by the last sent shadow marker.

4. The computing hub of claim 1, wherein the instructions cause the processor to further:
determine a difference between the last write marker and the last sent shadow marker to identify an amount of time lag between writing the device data to the buffer associated with the local device shadow of the device and sending the device data written to the buffer to the device shadowing service in the service provider environment;
determine whether the amount of time lag satisfies a notification rule; and
generate a notification when the amount of time lag satisfies the notification rule.

5. The computing hub of claim 1, wherein the instructions cause the processor further to:
determine a difference between the last write marker and the last sent shadow marker to identify an amount of device data written to the buffer associated with the local device shadow of the device and waiting to be sent to the device shadowing service in the service provider environment;
determine whether the amount of device data written to the buffer associated with the local device shadow of the device and waiting to be sent to the device shadowing service in the service provider environment satisfies a notification rule; and
generate a notification when the amount of device data written to the buffer associated with the local device shadow of the device and waiting to be sent to the device shadowing service in the service provider environment satisfies the notification rule.

6. A method, comprising:
receiving, at a computing hub, device data from a device in a local network;
writing the device data received from the device to a buffer associated with a local device shadow of the device;
identifying a last write marker representing a last data entry written to the buffer and a last sent shadow marker representing a last data entry of the buffer sent to a device shadowing service in a service provider environment; and
sending, by the computing hub, the last write marker and the last sent shadow marker to the device shadowing service in the service provider environment to be shadowed in a remote device shadow of the device.

7. The method of claim 6, further comprising:
receiving an instruction to manage the local device shadow of the device due to a computing failure event in another computing hub;
receiving computing hub information that includes the last write marker and the last sent shadow marker from the remote device shadow at the service provider environment;
verifying whether the device data received from the device has been written to the buffer associated with the local device shadow of the device using the last write marker; and
sending the device data written to the buffer to the device shadowing service in the service provider environment as defined by the last sent shadow marker to be shadowed in the remote device shadow of the device.

8. The method of claim 6, further comprising:
receiving an instruction to manage the local device shadow of the device due to a computing interruption event in the computing hub;
retrieving computing hub information that includes the last write marker and the last sent shadow marker from the local device shadow of the device;
verifying whether the device data received from the device has been written to the buffer associated with the local device shadow of the device using the last write marker; and
sending the device data written to the buffer to the device shadowing service in the service provider environment as defined by the last sent shadow marker to be shadowed in the remote device shadow of the device.

9. The method of claim 6, further comprising:
determining a difference between the last write marker and the last sent shadow marker to identify an amount of time lag between writing the device data to the buffer associated with the local device shadow and sending the device data written to the buffer to the device shadowing service in the service provider environment;
determining whether the amount of time lag satisfies a notification rule; and
generating a notification when the amount of time lag satisfies the notification rule.

10. The method of claim 6, further comprising:
determining a difference between the last write marker and the last sent shadow marker to identify an amount of device data written to the buffer associated with the local device shadow of the device and waiting to be sent to the device shadowing service in the service provider environment;
determining whether the amount of device data written to the buffer associated with the local device shadow of the device and waiting to be sent to the device shadowing service in the service provider environment satisfies a notification rule; and generating a notification when the amount of device data written to the buffer associated with the local device shadow of the device and waiting to be sent to the device shadowing service in the service provider environment satisfies the notification rule.

11. The method of claim 6, further comprising:

receiving a request to access the device data received from the device stored in the remote device shadow of the device; and determining whether to allow the request using computing hub information that includes the last write marker and the last sent shadow marker stored in the local device shadow of the device.

12. The method of claim 11, further comprising:

verifying that a predetermined amount of the device data received from the device has been stored in the local device shadow of the device using the last write marker to determine whether to allow the request.

13. The method of claim 6, further comprising:

monitoring computing hub information that includes the last write marker and the last sent shadow marker stored in the local device shadow of the device;

verifying whether a predetermined amount of the device data received from the device has been stored in the local device shadow of the device using the last write marker; and triggering occurrence of an event in response to verifying that the predetermined amount of the device data received from the device has been stored in the local device shadow of the device.

14. The method of claim 13, further comprising:

monitoring computing hub information that includes the last write marker and the last sent shadow marker stored in the local device shadow of the device;

verifying whether a predetermined amount of the device data received from the device stored in the local device shadow of the device is waiting to be sent to the device shadowing service in the service provider environment using a difference between the last write marker and the last sent shadow marker; and sending the predetermined amount of the device data to the device shadowing service in the service provider environment to be shadowed in the remote device shadow.

15. A method, comprising:

receiving, at a monitoring service in a service provider environment, a performance metric for a computing hub that is storing device data received from a device in a buffer associated with a local device shadow of the device, wherein the local device shadow is sent to a device shadowing service in the service provider environment to be shadowed in a remote device shadow of the device;

monitoring the remote device shadow of the device for changes;

determining, from the remote device shadow of the device, a change in computing hub information that includes a last write marker representing a last data entry written to the buffer and a last sent shadow marker representing a last data entry of the buffer sent to the device shadowing service in the service provider environment; and generating performance data for the computing hub according to the performance metric using the change in the computing hub information.

16. The method of claim 15, further comprising:

determining a difference between the last write marker and the last sent shadow marker to identify an amount of time lag between the computing hub writing of the device data received from the device to the buffer and the computing hub sending the device data written to the buffer to the device shadowing service in service provider environment;

determining whether the amount of time lag satisfies a notification rule; and sending a notification when the amount of time lag satisfies the notification rule.

17. The method of claim 15, further comprising:

determining a difference between the last write marker and the last sent shadow marker to identify an amount of device data written to the buffer associated with the local device shadow of the device and waiting to be sent by the computing hub to the device shadowing service in the service provider environment;

determining whether the amount of device data written to the buffer associated with the local device shadow of the device and waiting to be sent by the computing hub to the device shadowing service in the service provider environment satisfies a notification rule; and sending a notification when the amount of device data written to the buffer associated with the local device shadow of the device and waiting to be sent by the computing hub to the device shadowing service in the service provider environment satisfies the notification rule.

18. The method of claim 15, further comprising:

receiving a request to access the device data received from the device, as stored in the remote device shadow of the device; and determining whether to allow the request using the computing hub information that includes the last write marker and the last sent shadow marker stored in the remote device shadow of the device.

19. The method of claim 15, further comprising:

determining whether utilization of a resource of the computing hub affects an ability of the computing hub to process the device data received from the device using the performance data; and generating a recommendation to modify the resource when the utilization of the resource affects the ability of the computing hub to process the device data received from the device.

20. The method of claim 15, further comprising:

triggering occurrence of an event to process the device data associated with the remote device shadow of the device in response to monitoring the computing hub information in the remote device shadow of the device for a change in a write or shadowing upload status of the device data received from the device.

* * * * *